US009791333B2

(12) United States Patent
Armani et al.

(10) Patent No.: US 9,791,333 B2
(45) Date of Patent: Oct. 17, 2017

(54) PORTABLE POLARIMETRIC FIBER STRESS SENSOR SYSTEM FOR VISCO-ELASTIC AND BIOMIMETIC MATERIAL ANALYSIS

(71) Applicant: UNIVERSITY OF SOUTHERN CALIFORNIA, Los Angeles, CA (US)

(72) Inventors: Andrea M. Armani, Pasadena, CA (US); Mark C. Harrison, Los Angeles, CA (US); Alexa Watkins Hudnut, La Canada, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 15/178,795

(22) Filed: Jun. 10, 2016

(65) Prior Publication Data

US 2017/0038267 A1   Feb. 9, 2017

Related U.S. Application Data

(60) Provisional application No. 62/173,758, filed on Jun. 10, 2015.

(51) Int. Cl.
*G01L 1/24* (2006.01)
*G02B 6/024* (2006.01)

(52) U.S. Cl.
CPC ........... *G01L 1/243* (2013.01); *G02B 6/024* (2013.01)

(58) Field of Classification Search
CPC .................. G01L 1/243; G02B 6/024
USPC .......................... 73/760, 777, 790
See application file for complete search history.

(56) References Cited

U.S. PATENT DOCUMENTS

| 5,386,484 A * | 1/1995 | Ooka ............... G01C 19/722 385/11 |
| 6,292,287 B1 * | 9/2001 | Fujinoki ........... G02B 21/0068 359/201.1 |
| 6,342,945 B1 * | 1/2002 | Allen ................ G01M 11/336 356/73.1 |

(Continued)

OTHER PUBLICATIONS

Harrison, M.C. et al., "Portable Polarimetric Fiber Stress Sensor System for Visco-Elastic and Biomimetic Material Analysis," Applied Physics Letters 106, 191105 (2015), 6 pgs.

(Continued)

*Primary Examiner* — Max Noori
(74) *Attorney, Agent, or Firm* — Brooks Kushman P.C.

(57) ABSTRACT

An all-optical fiber sensor apparatus includes a light source and an in-line fiber polarizer that polarizes light received from the light source. The in-line fiber polarizer outputs light in a first polarization state which is directed to a polarization-maintaining fiber. After receiving the light in a first polarization state, the polarization-maintaining fiber transmits the light such that the light exits as light in a second polarization state. During measurements, the polarization-maintaining fiber contacts a test sample. A compression device compresses the test sample. The compression device applies a time varying force to the test sample in which the force is sequentially increased. A polarimeter receives the light in a second polarization state and outputs polarization state data for the light in a second polarization state. Finally, a data processor is in communication with the polarimeter to receive and stores the polarization state data.

28 Claims, 17 Drawing Sheets

(56) References Cited

U.S. PATENT DOCUMENTS

| | | | |
|---|---|---|---|
| 6,513,390 B1* | 2/2003 | De La Puente | G01B 11/165 |
| | | | 73/800 |
| 2011/0077528 A1* | 3/2011 | Kemp | A61B 5/0066 |
| | | | 600/476 |
| 2011/0144505 A1* | 6/2011 | Yamamoto | A61B 5/0064 |
| | | | 600/476 |
| 2014/0081264 A1* | 3/2014 | Fandrey | A61B 5/6885 |
| | | | 606/46 |
| 2015/0020642 A1* | 1/2015 | Fujiwara | B60T 7/042 |
| | | | 74/512 |

OTHER PUBLICATIONS

Supplement to: Harrison, M.C. et al., "Portable Polarimetric Fiber Stress Sensor System for Visco-Elastic and Biomimetic Material Analysis," Applied Physics Letters 106, 191105 (2015), 8 pgs.

\* cited by examiner

PORTABLE POLARIMETRIC FIBER STRESS SENSOR SYSTEM FOR VISCO-ELASTIC AND BIOMIMETIC MATERIAL ANALYSIS

CROSS-REFERENCE TO RELATED APPLICATION

This application claims the benefit of U.S. provisional application Ser. No. 62/173,758 filed Jun. 10, 2015, the disclosure of which is incorporated in its entirety by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

STATEMENT REGARDING FEDERALLY SPONSORED RESEARCH

This invention was made with government support under Contract No. N00014-11-1-0910, awarded by the Office of Naval Research (ONR). The Government has certain rights in the invention.

TECHNICAL FIELD

In at least one aspect, the present invention relates to methods and equipment for measuring stress in a sample.

BACKGROUND

Non-destructive and rapid materials characterization methods have greatly expanded our understanding of fundamental materials behavior, and this knowledge has found numerous applications throughout society[1]. For example, a material's mechanical properties, such as the Young's modulus, degrade over time and can be used as a predictive indicator or marker of failure. Therefore, by combining failure analysis with mechanical deformation diagnostic measurements, the remaining lifetime of key aircraft components such as helicopter blades can be predicted, allowing preventative maintenance to be performed[2]. Recently, this type of analysis has been translated to the bio-domain and applied to more visco-elastic materials[3,4]. These types of materials exhibit significantly different mechanical behaviors and have more complex sample handling requirements; for example, experiments with human tissue samples need to be performed in biosafety cabinets. Given these types of regulations, the conventional measurement instrumentation (a load-frame or load cell) is no longer suitable. Therefore, researchers are increasingly turning to alternative methods, such as nano-indentation, atomic force microscopy (AFM), and sonoelastography, to solve these challenges[5-7]. In previous work, these techniques have successfully characterized the Young's modulus of biomimetic samples and of tissue[8,9]. However, these methods all face unique hurdles: nanoindentation generates results which require complex analysis and it has a large footprint, AFM is extremely sensitive to environmental vibrations, and sonoelastography requires manual, uncontrolled compression for signal generation. Therefore, a new system is needed which: 1) has a small footprint suitable for biosafety cabinet operation or other point-of-caré settings, 2) maintains high sensitivity, 3) uses disposable or sterile sensors, and 4) analyzes samples non-destructively and quickly.

The most approach for meeting these requirements is to reduce the number of components and simplify the operation. One promising method is based on optical fiber sensors; in particular, optical sensors based on polarization-maintaining (PM) optical fiber[10]. This method meets the requirements for disposability, non-destructive, and rapid analysis. In addition, these devices have a high tolerance to environmental noise, and the theoretical sensitivity is comparable. However, despite their strengths, previous work with polarimetric stress and pressure sensors has typically required free-space optical components, such as polarizers, which require alignment and are not portable[11,12]. Additionally, these systems relied on an analyzer to probe the polarization state of the fiber at the output. This method reduces the amount of information that can be obtained from these types of sensors, limiting the overall utility. However, significant innovation in the system design and in the signal analysis was needed in order to realize a portable system based on this strategy.

SUMMARY

We have developed an all-fiber-based material analysis system based on optical polarimetric elastography. Unlike previous polarimetric systems which relied on free-space components, our method combines an in-line polarizer, polarization-maintaining fiber, and a polarimeter to measure the arbitrary polarization state of the output, eliminating all free-space elements. To further improve ease-of-use, we developed a more generalized theoretical analysis which allows more information about the polarization state to be obtained via the polarimeter. The system has been experimentally verified using a series of elastomer samples made from polydimethylsiloxane (PDMS), a commonly used biomimetic material. In addition, to further expand the system's utility, we have developed a multiplexed version, in which multiple polarimetric sensors operate in parallel. This approach allows several points on a sample to be measured without moving the sample.

The present invention solves one or more problems of the prior art, by providing an all-optical fiber sensor apparatus. The apparatus includes a light source and an in-line fiber polarizer that polarizes light received from the light source. The in-line fiber polarizer outputs light in a first polarization state which is directed to a polarization-maintaining fiber having a fast axis and a slow axis. After receiving the light in a first polarization state, the polarization-maintaining fiber transmits the light such that the light exits as light in a second polarization state. During measurements, the polarization-maintaining fiber contacts a test sample. A compression device applies a force (F) to and compresses the test sample that is in contact with the polarization-maintaining fiber. The force is applied over at a defined contact area on the test sample. The compression device applies a time varying force to the test sample in which the force is sequentially increased. A polarimeter receives the light in a second polarization state and outputs polarization state data for the light in a second polarization state. Finally, a data processor is in communication with the polarimeter to receive and to store the polarization state data.

In another embodiment, a multiplexed all-optical fiber sensor apparatus is provided. The multiplexed apparatus includes a light source, an in-line fiber polarizer that polarizes light received from the light source, and a plurality of polarization-maintaining fibers contacting a test sample.

Each polarization-maintaining fiber has a fast axis and a slow axis. The in-line fiber polarizer outputs light in a first polarization state which is directed to a light multiplexing optical power splitter or active optical power switch that allows the light in a first polarization state to be selectively output to a selected polarization-maintaining fiber from the plurality of polarization-maintaining fibers. The selected polarization-maintaining fiber receives the light in a first polarization state which is then transmitted through the polarization-maintaining fiber exiting as light in a second polarization state. The light multiplexing switch cyclically selects each fiber of the plurality of polarization-maintaining fibers. A compression device applies a force (F) to and compresses the test sample that is in contact with the plurality of polarization-maintaining, the force being applied over at a contact area on the test sample. Characteristically, the compression device applies a time varying force to the test sample in which the force is sequentially increased. The output from the plurality of polarization fibers is directed to a light multiplexing switch that sequentially sends the second polarization state to a polarimeter. A polarimeter outputs polarization state data for the light in a second polarization state. A data processor in communication with the polarimeter receives and stores the polarization state data as a function of time.

Advantageously, embodiments of the present invention replace all free-space components with in-line fiber counterparts and use a polarimeter to measure the arbitrary polarization state of the output light, which increases the information obtained. This combination of changes eliminates the need for any alignment. Given the increase in information, we also expand upon and generalize the previous theoretical algorithm for analyzing polarimetric sensors[10,11]. The combination of these improvements results in a portable, adaptable, and simple-to-use all optical fiber based sensing platform.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
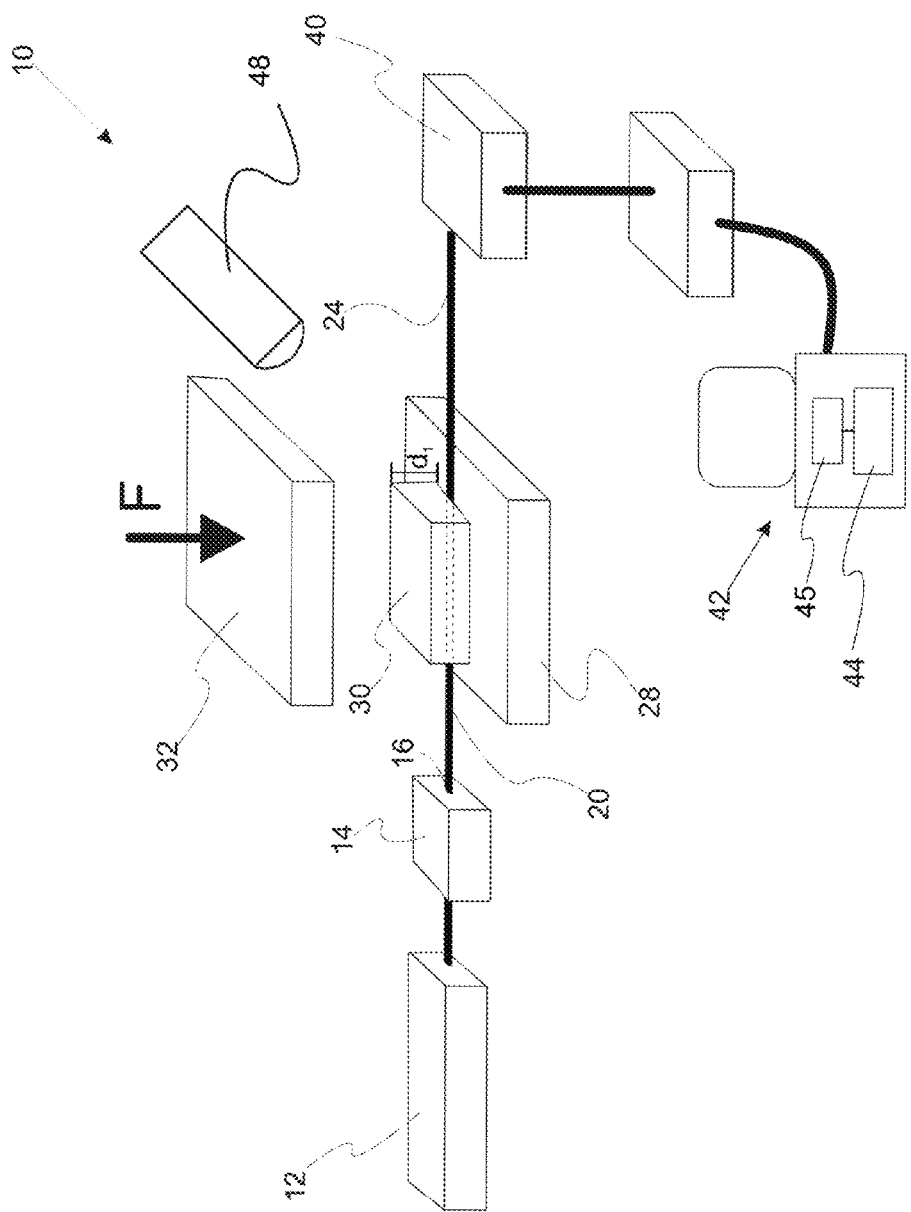
FIG. 1. A schematic illustration of an all-optical fiber sensor apparatus.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

The term "polarization-maintaining optical fiber (PM fiber) is a single-mode optical fiber in which linearly polarized light is maintained in a linear polarization during propagation.

The term "beat length $L_b$" means the distance over which a wave in one mode experiences an additional delay of one wavelength compared to the other polarization mode.

With reference to FIG. 1, a schematic illustration of an apparatus for measuring stress in a sample is provided. Stress measuring system 10 includes a light source 12 that provides light to an in-line fiber polarizer 14. In-line polarizer 14 polarizes light received from the light source 12. Typically light source 12 is a monochromatic light source such as a laser. In a refinement, light source 12 provides light in a wavelength range from 350 nm to 6000 nm. Therefore, polarized light in a first polarization state, and in particular, linearly polarized light is provided to polarization-maintaining fiber 20. In-line polarizer 14 is attached/coupled to input 16 of the polarization-maintaining fiber 20 in order to provide the input light thereto. Characteristically, polarization-maintaining fiber 20 has a fast axis and a slow axis as describe below in more detail. Polarization-maintaining fiber 20 transmits the received polarized light from the in-line fiber polarizer 14 through the polarization-maintaining fiber exiting from output 24 as output light in a second polarization state. At least a portion of polarization-maintaining fiber 20 is disposed over sample stage 28. Test sample 30 is placed onto sample stage 28. Polarization-maintaining (PM) fiber 20 is interposed between sample stage 28 and test sample 30.

Still referring to FIG. 1, compression device 32 applies a force (F) to and compresses sample 30 by a force F to the sample. The surface of sample 30 to which the force is applied is defined by a contact area which will be used in determining stress. In a refinement, the applied force is a time varying force in which the applied force is progressively increased as a function of time. In performing the compression, compression device 32 moves closer to sample stage 28. This provides a measure of the decrease in sample thickness $d_1$ during the measurements. In a variation, sample stage 28 and compression device 32 are components of a single compression system such as an Instron load-frame as set forth below in more detail. However, the compression strategy is not limited to this system. The output light in a second polarization state is provided to polarimeter 40 that outputs polarization state data for the output light to data processor 40 in electrical communication with the polarimeter. Data processor 42 receives and stores the polarization state data typically as a function of time. Data processor 42 can be a laptop, desktop, field programmable array, or the like. In a refinement, data processor 42 includes transient (e.g., RAM) or non-transient memory (e.g. hard drive) 44 that stores the polarization state data. Memory 44 is in communication with CPU 45. Typically, data processor 42 determines stress as a function of strain for the test sample from the polarization state data as set forth below in more detail. In a refinement, data processor 42 is operable to calculate stress as a function of strain for the test sample from the polarization state data. In another refinement, stress measuring system 10 also includes integrated imaging system 48 to monitor sample deformation. Imaging system 48 can be any type of image monitoring/recording system such as a video system, cell phone, and the like.

Typically, the second polarization state is characterized by Stokes parameters ($s_0$, $s_1$, $s_2$, and $s_3$) and data processor 42 operable to convert the Stokes parameters to a single variable representing a change in polarization ($\Delta$Pol) that is related to the applied force. Therefore, a data processor can be operable to calculate the force (F) applied to the test sample from a calibration curve that plots force versus change in polarization ($\Delta$Pol), stress by dividing the force (F) by the contact area, and strain by dividing a change is thickness for the test sample divided by an initial thickness. In a further refinement, calibration curve is determined by applying known forces to a reference sample and measuring the change in polarization.

In another refinement, data processor 42 is operable to numerically determine the force (F) applied to the test sample from equations 1, 2, and 3:

$$F=2N^3(1+\sigma)(p_{12}-p_{11})L_{b0}f/(\lambda\pi bY) \quad (1)$$

$$\tan(2\phi)=F\sin(2\alpha)/(1+F\cos(2\alpha)) \quad (2)$$

$$L_b=L_{b0}(1+F^2+2F\cos(2\alpha))^{-1/2} \quad (3)$$

f is a force acting upon the polarization-maintaining fiber;
σ is Poisson's ratio for the polarization-maintaining fiber;
α is an angle at which f acts with respect to a fast and slow axis coordinate system of the polarization-maintaining fiber;
$L_{b0}$ is an unstressed beat length;
$p_{ij}$ are photoelastic constants for the polarization-maintaining fiber;
Y is a Young's modulus of the polarization-maintaining fiber;
b is a radius of a fiber cladding; and
ϕ is the angle by which light is further rotated in traveling from a polarization-maintaining fiber input to a stressed section of fiber. Additional details of this analysis are set forth below.

Figure 2:
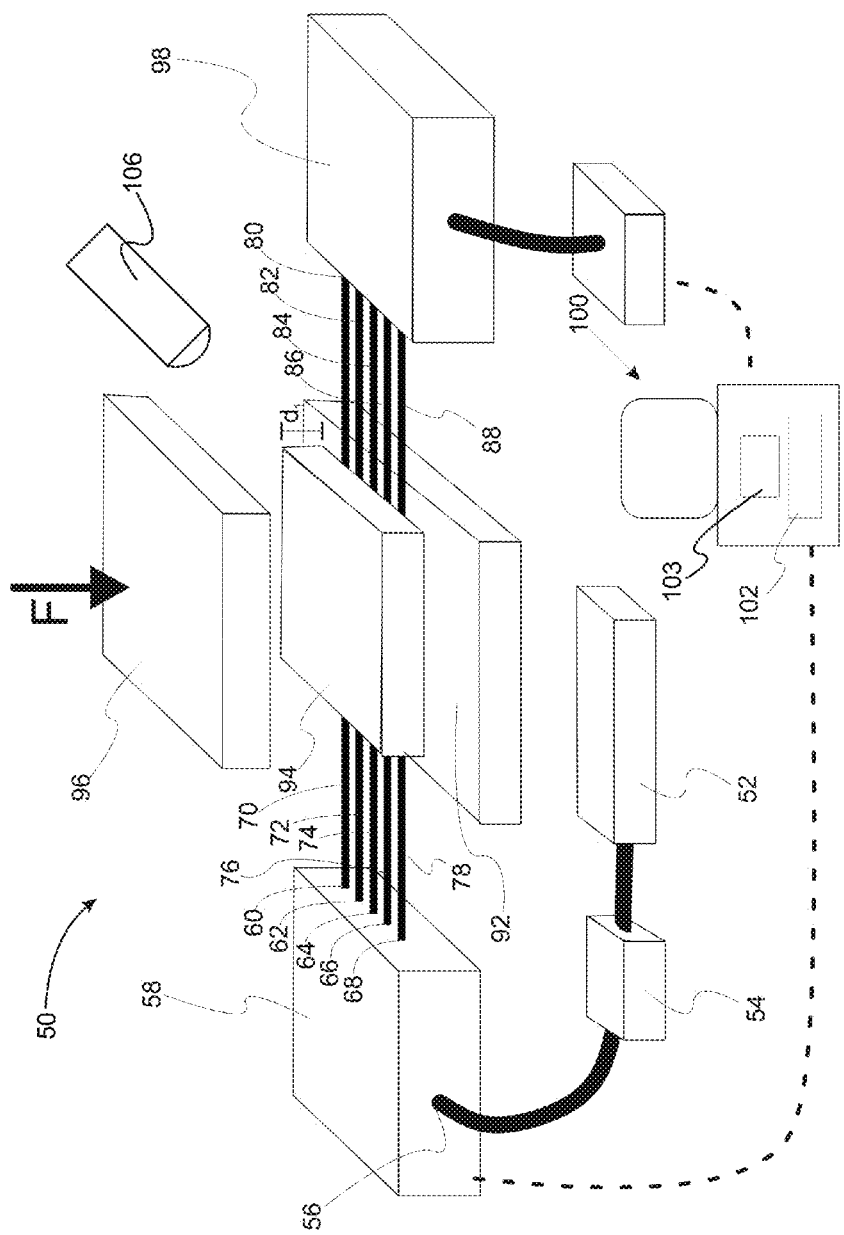
FIG. 2. A schematic illustration of a multiplexed all-optical fiber sensor apparatus.

In still another variation, the apparatus of FIG. 1 includes one or more additional polarization-maintaining fibers as illustrated in FIG. 2. With reference to FIG. 2, a schematic illustration of a multiplexed apparatus for measuring stress in a sample is provided. The multiplexed apparatus of this embodiment allows for 2-dimension map of the stress versus strain for a test sample to be obtained. Stress measuring system 50 includes light source 52 that provides light to an in-line fiber polarizer 54. Typically light source 52 is a monochromatic light source such as a laser. In a refinement, light source 52 provides light in a wavelength range from 350 nm to 6000 nm. In-line fiber polarizer 54 polarizes light received from the light source 52 and outputs light in a first polarization state. In-line polarizer 14 is attached/coupled to input 56 of first light multiplexing splitter 58 in order to provide the input light thereto. First light multiplexing splitter 58 allows the light in a first polarization state to be outputted to a selected polarization-maintaining fiber from the plurality of polarization-maintaining fibers 70-78. The selected polarization-maintaining fiber receives the light in a first polarization state which is then transmitted through the polarization-maintaining fiber exiting as light in a second polarization state. First light multiplexing splitter 58 can be passive or active. For a passive switch, the input light is simply split among plurality of polarization-maintaining fibers 70-78. Therefore, a passive splitter simultaneously outputs light to the selected polarization-maintaining fiber and to multiple additional polarization-maintaining fibers. For an active splitter, the light is sequentially outputted to a selected fiber from plurality of polarization-maintaining fibers 70-78. In an alternate variation, light source 52 can provide light to light multiplexing switch 58. In this alternative, each of the outputs of light multiplexing switch 58 is coupled to separate polarizers.

Still referring to FIG. 2, each of polarization-maintaining fibers 70-78 have a portion that is disposed over sample stage 92 to form an array of polarization-maintaining fibers. Typically, polarization-maintaining fibers 70-78 have a fiber-to-fiber spacing equal to or less than 1 mm. Although the present variation is not limited to any particular number of fibers, the number of fibers can be from 2 to 1024. In one refinement, the number of fibers can be from 2 to 64. In another refinement, the number of fibers is from 64 to 128.

Test sample 94 is placed onto sample stage 92 over polarization-maintaining fibers 70-78. Polarization-maintaining fibers 70-78 are interposed between sample stage 92 and test sample 94. Compression device 96 compresses sample 94 by a force F applied to the sample. In a refinement, the applied force is a time varying force. In performing the compression, compression device 32 moves closer to sample stage 28. This provides a measure of the decrease in sample thickness $d_1$ during the measurements. Second light multiplexing switch 98 allows the light in a second polarization state to be selectively outputted to polarimeter 100 from the selected polarization-maintaining fibers. Second light multiplexing switch 98 cyclically selecting each fiber of the plurality of polarization-maintaining fibers 70-78 as the selected fiber. Polarimeter 98 outputs polarization state data for the output light from the selected polarization-maintaining fiber to data processor 100 in electrical communication with the polarimeter. Data processor 100 receives the polarization state data typically as a function of time. Typically, data processor 100 is a computer (i.e., laptop, desktop, etc.). In a refinement, data processor 100 includes transient (e.g., RAM) and/or non-transient memory (e.g., hard drieve) 102 that stores the polarization state data and is in communication with CPU 103. Data processor 100 determines stress as a function of strain for the test sample from the polarization state data as set forth below in more detail. Moreover, data processor controls the light multiplexing switch issuing control signals so that light multiplexing switch 58 cycles through polarization-maintaining fibers 70-78. In another refinement, stress measuring system 50 also includes integrated imaging system 106 to monitor sample deformation. Imaging system 106 can be any type of image monitoring/recording system such as a video system, cell phone, and the like. Moreover, in the case of first light multiplexing splitter 58 being a passive switch, data processor 100 or another computer controls the second light multiplexing switch. When of first light multiplexing splitter 58 being an active switch data processor 100 or another computer controls the first and second light multiplexing switches.

As set forth above, data processor 100 or another data process/computer are operable to convert the Stokes parameters to a single variable representing a change in polarization (ΔPol) that is related to the applied force that the processor uses to calculate the force (F) applied to the test sample from a calibration curve that plots force versus change in polarization (ΔPol), stress by dividing the force (F) by the contact area, and strain by dividing a change is thickness for the test sample divided by an initial thickness. In this context, "operable" means that the data processor executes steps to perform these calculations. In a further refinement, calibration curve is determined by applying known forces to a reference sample and measuring the change in polarization. Advantageously, data processor 100 is operable to calculate stress as a function of strain for the test sample from the polarization state data as a map over the contact area. In another variation, the data processor is operable to numerically determine the force (F) applied to the test sample from equations 1, 2, and 3 for each of polarization-maintaining fibers 70-78 when selected for use.

Figure 3A:
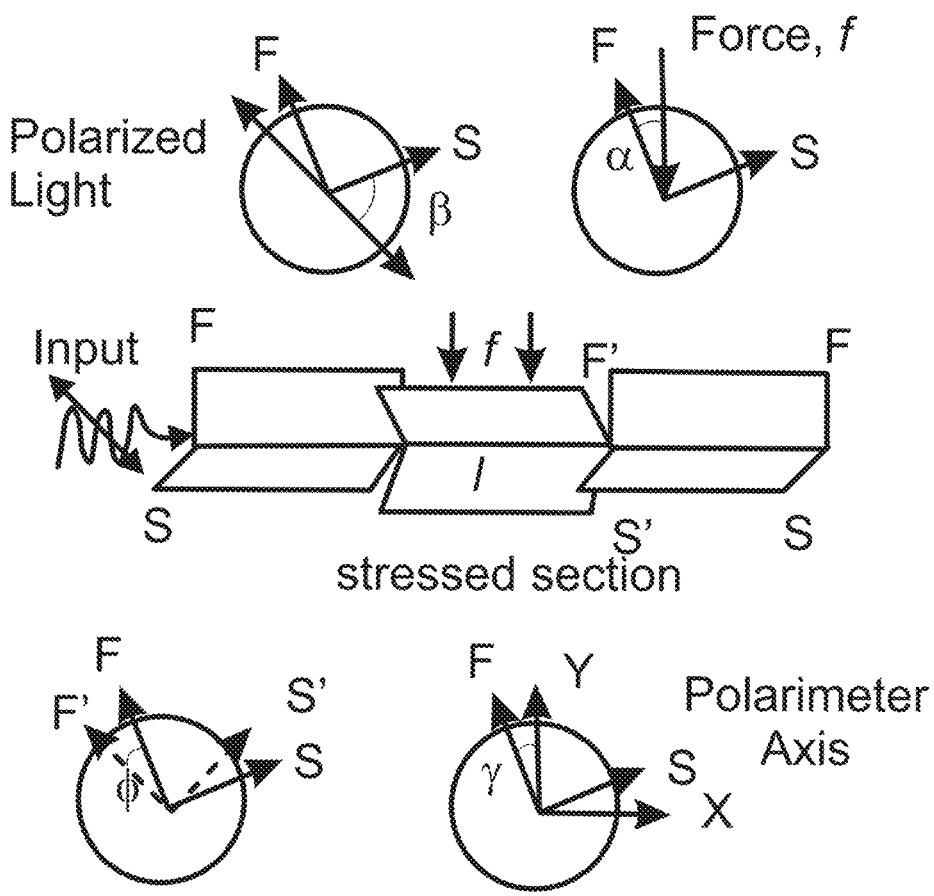
FIGS. 3A-B. Schematic diagram defining the angles used in our analysis as light propagates through the system while it interacts with the sample. The angle $\alpha$ is the angle between the applied force and the fast and slow axes of the fiber, $\beta$ is the angle between the polarized light and the fast and slow axes of the PM fiber, $\gamma$ is the angle between the fast and slow axes of the fiber and the polarimeter axes, and $\phi$ is the angle of rotation the fast and slow axes undergo when stress is applied to the fiber.
Figure 3B:
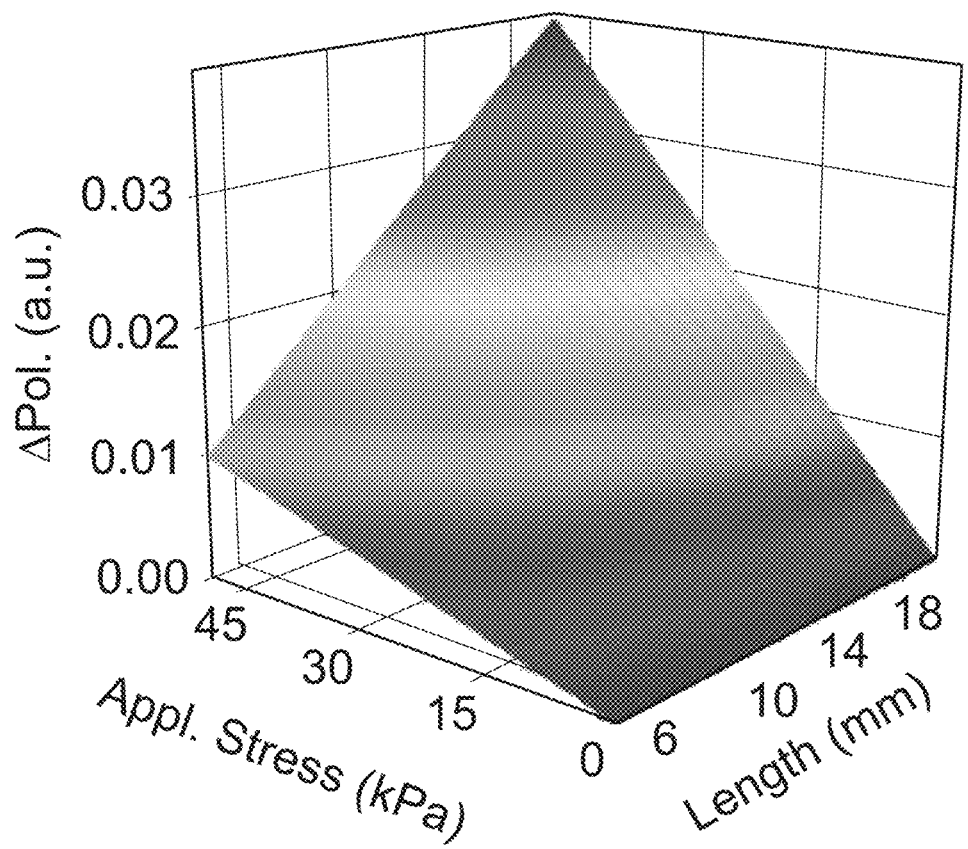

As set forth above, the polarization state data obtained by the systems of FIGS. 1 and 2 are used to determine the stress and strain relationship for test sample 30. Details of this analysis are set forth in M. Harrison, A. M. Armani, "Portable polarimetric fiber stress sensor system for visco-elastic and biomimetic material analysis", Applied Physics Letters 106 (20), 191105 (2015); the entire disclosure of which is hereby incorporated by reference. The theoretical mechanism of this determination is based on the photo-elastic effect. When stress is applied to the PM fiber, the beat length of the stressed section will change, and the fast and slow axes of the fiber will undergo a rotation of angle φ (FIG. 3A and 3B). Following the same analysis as in Chua, et. al.[10], we consider a two-dimensional cross-section of the stressed fiber that is acted upon by a force f [N/m] at an angle α with respect to the fast and slow axis coordinate system of the fiber. The equations governing a normalized force F, φ and the stressed beat length ($L_b$) for a given force f [N/m] are given below:

α, β, γ, and δ

$$F = 2N^3(1+\sigma)(p_{12}-p_{11})L_{b0}f/(\lambda \pi b Y) \quad (1)$$

$$\tan(2\phi) = F\sin(2\alpha)/(1+F\cos(2\alpha)) \quad (2)$$

$$L_b = L_{b0}(1+F^2+2F\cos(2\alpha))^{-1/2} \quad (3)$$

In these equations, σ is Poisson's ratio for the fiber, $L_{b0}$ is the unstressed beat length, $p_{ij}$ are photoelastic constants, Y is the Young's modulus of the fiber, and b is the radius of the fiber cladding, in meters. Additionally, the refractive indices of the fiber fast and slow axis are given by N and N+$\Delta N_0$, and $\Delta N_0$ is related to $L_{b0}$, by the equation $\Delta N_0 = \lambda/L_{b0}$, where λ is the free space wavelength. Based on our system, we used the following values: $Y=7.3\times 10^{10}$ N/m², σ=0.17, b=62.5 μm, N=1.46, $L_{b0}$=2 mm, $p_{11}$=0.121 and $p_{12}$=0.27[10].

Figure 4B:
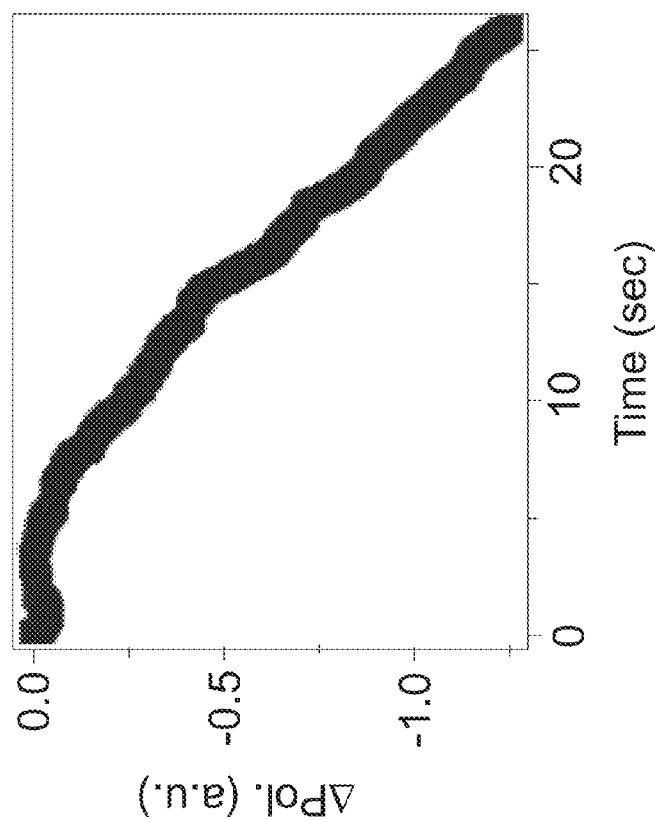
FIGS. 4A-B. A) Plot of raw data from the polarimeter on a Poincaré sphere. The arrow indicates how the polarization changes as stress are applied to the fiber. B) Plot of change in polarization vs. time of the same raw data shown in part b) after the polarization state has been analyzed to produce a single variable representing the change in polarization state.

FIG. 4 shows a diagram of the various transformations the polarized light undergoes as it travels through the experimental setup, including the rotation φ caused by an applied force. By tracking the various transformations the light undergoes, we can determine what its polarization state will be at the output by building a series of transfer matrices:

$$\begin{bmatrix} E_x \\ E_y \end{bmatrix} = \begin{bmatrix} \cos\gamma & \sin\gamma \\ -\sin\gamma & \cos\gamma \end{bmatrix} \begin{bmatrix} 1 & 0 \\ 0 & e^{j\delta} \end{bmatrix} \begin{bmatrix} \cos\phi & -\sin\phi \\ \sin\phi & \cos\phi \end{bmatrix} \begin{bmatrix} e^{-jkN_sl} & 0 \\ 0 & e^{-jkN_fl} \end{bmatrix} \quad (4)$$

$$\begin{bmatrix} \cos\phi & \sin\phi \\ -\sin\phi & \cos\phi \end{bmatrix} \begin{bmatrix} \cos\beta & \sin\beta \\ -\sin\beta & \cos\beta \end{bmatrix} \begin{bmatrix} E_{x0} \\ 0 \end{bmatrix}$$

In this equation, $E_x$ and $E_y$ are the x and y components of the electric field when the light reaches the polarimeter, and $E_{x0}$ is the initial state of polarization, with the light completely polarized in the x direction. We will start with polarized light exiting the in-line polarizer and entering the PM fiber that acts as the transducer element. The polarized light is at an angle β with respect to the fast and slow axes of the PM fiber. When the light reaches the stressed section of fiber, the fast and slow axes are further rotated by an angle φ. In the stressed section, the light accumulates phase based on the length, l, of the stressed section and the new values of the fast and slow axis, $N_f$ and $N_s$, which are related to the stressed beat length by $N_s-N_f=2\pi/kL_b$. Upon exiting the stressed section, the light is rotated by an angle -φ to the original fast and slow axes of the PM fiber. Finally, the axes of the PM fiber may be rotated at an angle γ with respect to the x and y axes of the polarimeter.

There is one extra aspect of the transfer matrix which has not yet been accounted for. Since the polarized light is entering the PM fiber misaligned with the fast and slow axes, it will accumulate phase before and after the stressed section. The phase it accumulates in these sections will be related to the unstressed beat length, $L_{b0}$, and the effect will look similar to the matrix, which accounts for accumulated phase in the stressed section. However, to account for this phase in the same way would require an accurate measurement of the entire length of fiber, which may be difficult under certain circumstances. In an effort to reduce the complexity of the testing setup, the extra phase from before and after the stressed section has been rolled into one variable, δ. This removes any difficulties in determining the phase to the fitting algorithm which is used to calibrate our sensor using experimental data and the theoretical equations above. Removing the need to know the exact length of the fiber makes the sensor a more versatile tool and reduces the complexity of the measurement.

Figure 4A:
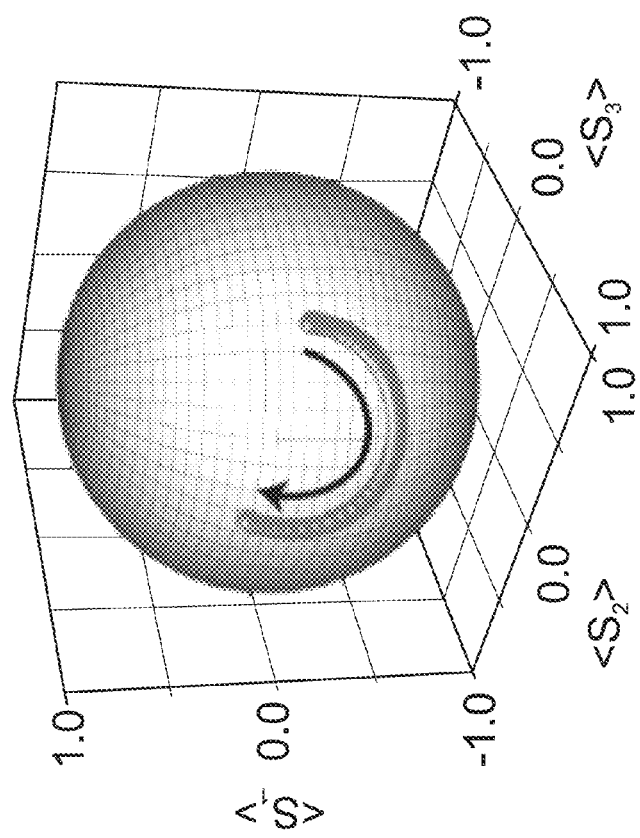

A diagram of the testing setup used is shown in FIG. 1. Light from a 980 nm or 1550 nm reference laser is coupled into an in-line fiber polarizer, which is in turn connected to a length of polarization-maintaining (PM) fiber. The PM fiber is placed under the sample under test and secured to the compression stage of an industrial load-frame (Instron) using tape. Finally, the PM fiber output is connected to a polarimeter, where the polarization state of the light is measured as stress is applied to the sample by the Instron load-frame (FIG. 4A, B). The arbitrary polarization state measured by the polarimeter is mathematically converted to a single variable which represents the change in polarization state[12]. Simultaneously, the Instron load-frame measures the stress and strain of the sample, serving as a reference measurement. The crosshead of the load-frame moves at a velocity of 0.1 mm/s during compression. In between the sample and the sample stage, a small amount of oil is added to reduce barreling of the sample which can distort the measurement.

The raw data is in the form of a polarization state versus time curve and must be calibrated to create a stress-strain curve. In the present work, calibration curves were generated after testing to create stress-strain curves for each run, and this conversion is done using the Instron reference data and the transfer matrix detailed above to create a fitting algorithm. The algorithm fits a theoretical polarization versus force curve to the measured data by finding optimized best-fit values for α, β, γ, and δ given a wavelength (λ) and interaction length (l). Specifically, the fitting algorithm utilizes the initial and final polarization states of the experimental data, and also requires knowledge of force required to create the final polarization state. While this force can be attained from the reference data, it can also be obtained by placing a free weight on top of the sample under test or by using an integrated force sensor. Once a best-fit has been generated, it is used to make a calibration curve.

The calibration curve is specific for a given set-up configuration. Exchanging samples causes α to vary slightly, requiring a new calibration curve to be taken. However, (β, γ, δ) will not change unless the entire system is moved. These types of initial calibration measurements are frequently performed in many fields.

To verify the ability of the system to characterize the mechanical properties of visco-elastic materials, we test our sensor using six different polydimethylsiloxane (PDMS) base:curing agent ratios spanning from 5:1 to 30:1. This range spans over an order of magnitude in Young's Modulus values and overlaps with common biomaterials such as tissue[6,9]. The PDMS samples are prepared using the procedures recommended by the manufacturer and cut into roughly 18 mm×18 mm×5 mm rectangular samples. This sample size fit completely under the Instron sample stage. For each base:curing agent ratio, we perform ten successive tests and measured the results using our sensor and an Instron industrial loadframe simultaneously. As such, the load-frame provides an ideal reference or control measurement. Before performing any measurements, the force on the sample is pre-loaded slightly to ensure uniform contact between the sample and the fiber. The sample is not moved and the setup was not disturbed between each of the ten tests. Additionally, to establish the background noise level, measurements are taken with the sensor system set up on the Instron load-frame with no sample and no compression. Complementary noise measurements are also taken with the system located on an optical table.

Using different sample sets, we test with both the 980 nm and the 1550 nm lasers to investigate the wavelength-dependent response. Each wavelength offers its own advantages and disadvantages. At shorter wavelengths of light, the sensor should offer greater sensitivity, since more wavelengths will fit in to the same interaction length. This advantage is somewhat confounded by the fact that the sensitivity will vary slightly each time the sensor is set up, since it depends on specific angles in the setup, notably $\alpha$. We can solve this issue by considering a case where all relevant variables ($\alpha$, $\beta$, $\gamma$, $\delta$, l) are the same. In this case, we calculated that the shorter wavelength, 980 nm, is slightly more sensitive to the applied force, f [N/m]. However, this assumes the same cross-sectional area of the fiber. In reality, the radius of the 1550 nm fiber is larger than the 980 nm (400 μm as compared to 245 μm). As such, for the same stress, the 1550 nm fiber will experience higher force than the 980 nm fiber. Therefore, when taking these two factors into consideration, the net effect is very similar sensitivity for both wavelengths, but warrants further experimental study.

Because PDMS is a visco-elastic material, the stress-strain curve is no longer linear[13]. Therefore, to determine the Young's modulus, the standard method is to fit the curve to a $3^{rd}$-order polynomial and take the derivative at a defined strain. For the present series of measurements, we fit the reference and the fiber sensor stress-strain curves and took the derivative of the polynomial fit at 30% strain.

Figure 5B:
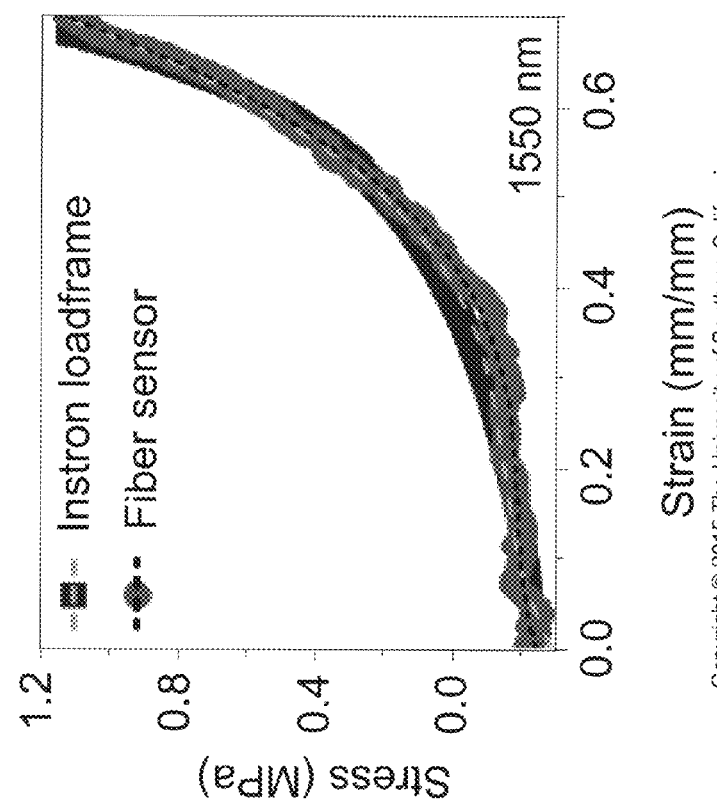
FIGS. 5A-B. Stress-strain curves for a 25:1 base:curing agent PDMS sample measured with A) 980 nm and B) 1550 nm laser and PM fiber. The trace of black squares is data that was measured from an Instron industrial load frame. The trace of blue circles is data that was measured simultaneously using our fiber-based sensor. $3^{rd}$-order polynomial fits are shown in green and red dashed lines, respectively. Despite some noise, there is very good agreement between both curves.
Figure 5A:
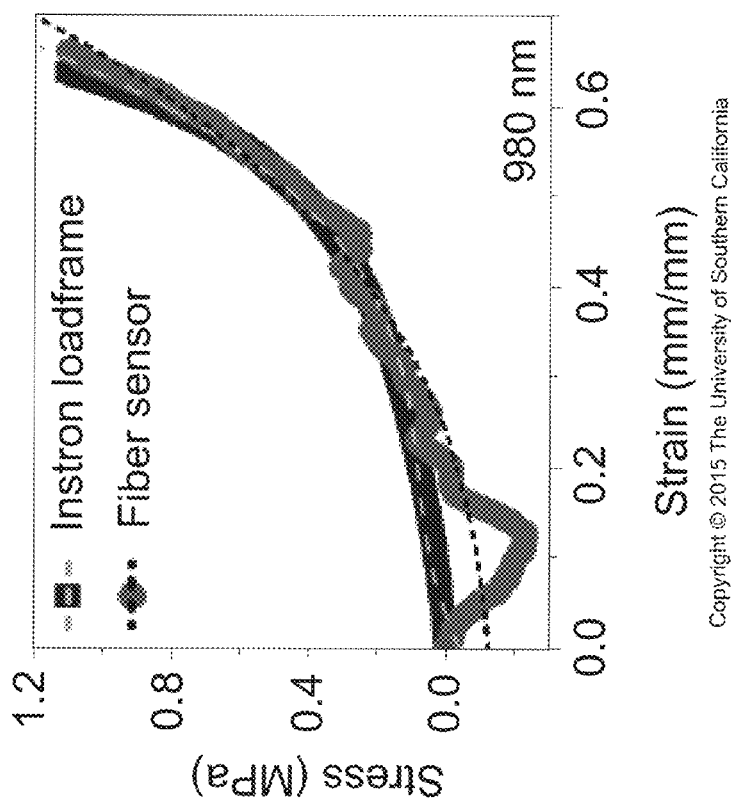
Figures 6A, 6B:
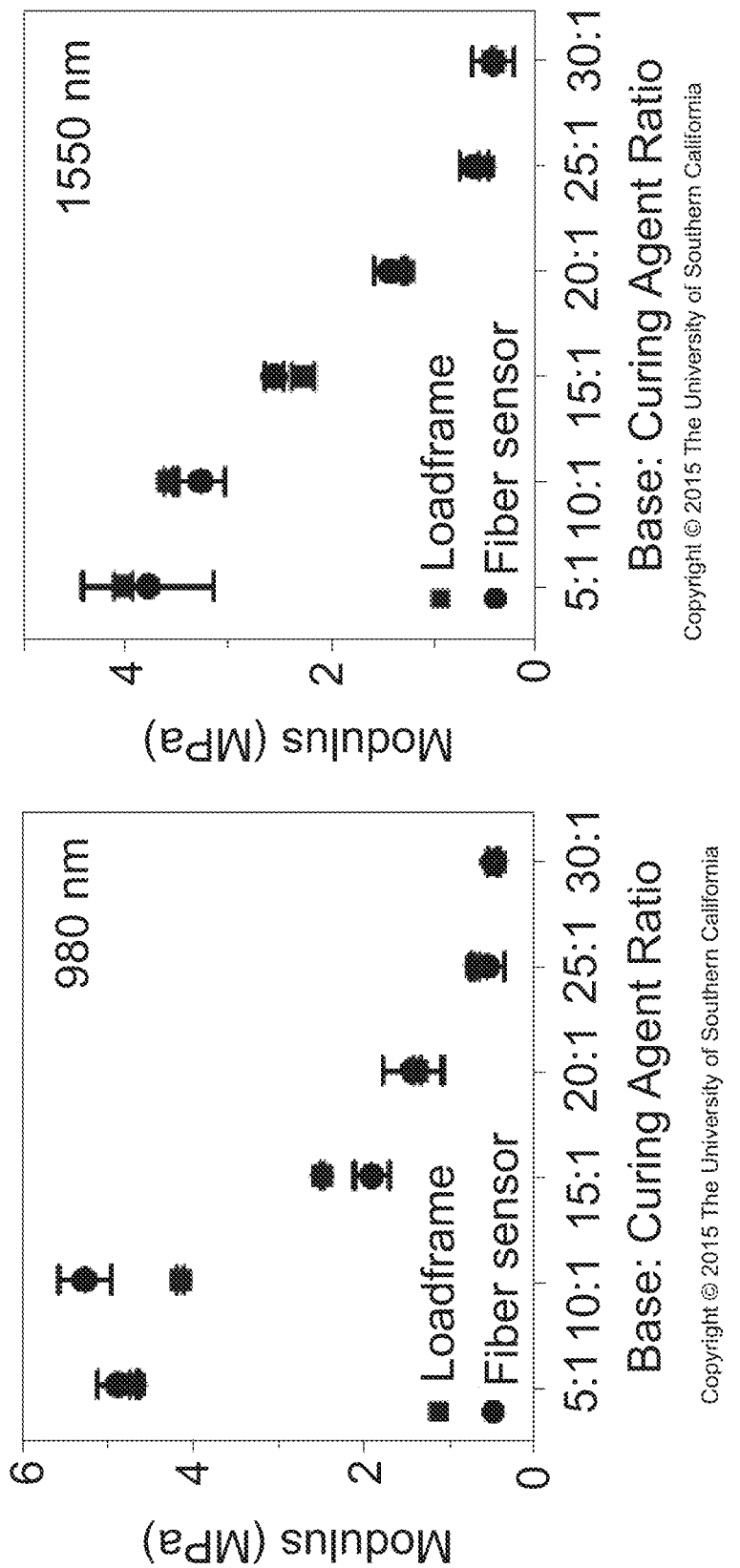
FIGS. 6A-B. Calculated Young's modulus values from the load-frame measurements and the fiber sensor data taken at both A) 980 nm and B) 1550 nm. The calculated values from self-consistent runs are averaged and are given here with their standard deviation.

FIG. 5 shows representative experimental measurements for a pair of 25:1 PDMS samples of approximately the same size characterized using the 980 nm and 1550 nm lasers. The polarimetric sensor results are overlaid on the load-frame reference results, and the polynomial fits are shown as dashed lines. Qualitatively, there is clearly good agreement over most of the measurement range, even for this highly elastic material. A small deviation is visible for low strain values of the 980 nm graph (FIG. 5A). This deviation is most likely due to the sample moving slightly in the oil which is required to reduce barreling. This artifact is commonly observed with highly visco-elastic materials. However, because the Young's Modulus is determined based on a fit to the entire data set, noise at low strain does not significantly impact the overall measurement results.

To quantitatively compare the two measurement methods at the different wavelengths, the Young's moduli are determined from fits to both sets of data at 30% strain and the values from all base:curing agent ratios are plotted in FIG. 4. The values in this figure are averaged from several measurements taken from the same sample and shown with their standard deviation as error bars, indicating good repeatability in our measurements. Additionally, the control measurements using the load-frame are plotted. From these plots, several key observations can be made. First, there is excellent agreement between the load-frame and the fiber sensor. Second, the deviation within a single data set is extremely low for both the load-frame and the fiber sensor. This agreement and accuracy are particularly notable given the reduction in complexity and footprint of the fiber sensor as compared to the load-frame.

To determine the ultimate theoretical sensitivity of our device, it is first necessary to determine the base noise limit. There are two possible noise sources: 1) optical noise inherent in the set-up and 2) movement of the fiber due to environmental vibrations. To thoroughly study the latter, we characterized our system's performance in four different environments: 1) a countertop in a standard synthetic chemistry lab, 2) inside of a laminar flow hood, which mimics a biosafety cabinet, 3) on an optical table and 4) in the materials analysis lab. For all environments, we calculate the theoretical sensitivity in the form of minimum detectable stress and minimum polarization change. The results from these measurements are given in Table I. Several trends are immediately apparent. When comparing across wavelengths, the noise is consistently lower at 1550 nm than 980 nm.

TABLE I

Noise levels given in ΔPol for different wavelengths and measuring environments

| | ΔPol | | Stress (kPa) | |
|---|---|---|---|---|
| Location | 980 nm | 1550 nm | 980 nm | 1550 nm |
| Mat. Analysis Lab | 0.02073 | 0.01606 | 30 | 23 |
| Countertop | 0.01814 | 0.01189 | 26 | 17 |
| Flow hood | 0.007 | 0.00423 | 10 | 6 |
| Optical Table | 0.00333 | 0.00303 | 5 | 4 |

When comparing across environments, the materials analysis lab was the noisiest environment, and therefore represents a good worst-case scenario for operating the sensor. This finding is not surprising as the load-frame is adjacent to other mechanical testing equipment in a multi-user materials analysis lab, and this equipment is continuously in use. Therefore, the environmental vibrations in this facility are extremely high. The noise level was lower for the countertop and flow hood, and was lowest on the vibration-isolating optical table. Interestingly, the noise in the laminar flow hood was lower than the noise level on the countertop and materials analysis lab. Although one might expect that the constant airflow of the flow hood would add environmental vibration and cause movement of the fiber, it seems to have stabilized the fiber instead, causing less movement. However, it is important to note that even in the worst-case scenario, the sensor is still sensitive enough to characterize biomaterials.

In conclusion, we have demonstrated a non-destructive fiber-based polarimetric stress sensor system which utilizes a more generalized theoretical analysis to reduce complexity in the experimental setup. The sensor shows good sensitivity, low noise and is able to accurately characterize the Young's modulus of visco-elastic or biomimetic materials after a simple calibration process. This flexible tool will be valuable to researchers for characterizing various deformable samples, such as tissue[4,5], when a portable, easy-to-use tool is necessary.

Data Acquisition and Analysis
Fitting Algorithm

There are four variables which are always unknown every time the fiber sensor system is set up: ($\alpha$, $\beta$, $\gamma$, $\delta$). In order to calibrate the sensor, these variables must be solved for.

Stokes Parameters

By multiplying out the matrices in equation 4 and plugging in values from equations 1-3, we can find equations for $E_x$ and $E_y$ as a function of $\alpha$, $\beta$, $\gamma$, and $\delta$. Using these equations in conjunction with the equations below, we can generate four equations for the Stokes parameters:

$$s_0 = |E_x|^2 + |E_y|^2 \quad (5)$$

$$s_1 = |E_x|^2 - |E_y|^2 \quad (6)$$

$$s_2 = 2Re\{E_x E_y^*\} \quad (7)$$

$$s_3 = -2Im\{E_x E_y^*\} \quad (8)$$

However, the polarimeter measures normalized stokes parameters. This has some important implications. Specifically, $s_0=1$ and the vector $<s_1, s_2, s_3>$ will have magnitude 1 and lie on the surface of the Poincaré sphere. Even using the value of $E_x$ and $E_y$ obtained from equation 4, $s_0=1$ because the system we consider only allows for fully polarized light. Therefore we have a system of three equations ($s_1$, $s_2$, $s_3$) with four unknowns ($\alpha, \beta, \gamma, \delta$) which we cannot solve directly. Fortunately, by using some knowledge of how the four angles affect the polarization trace generated by the sensor and knowledge of how much force was applied, we can fit our system of equations to experimental data using an algorithm and solve for the four angles. In the present work, this fit was performed using a MATLAB™ script and the reference data measured in parallel with our sensor data.

Solving for β and γ

When stress is applied to the PM fiber, the changing polarization state ($s_1$, $s_2$, $s_3$) will trace out a line on the Poincaré sphere. There are two key features about this process that are consistent given our theoretical analysis: 1) the line traced out will always be circular, and 2) the circle-trace will always be centered on the equator of the sphere ($s_3=0$, or linear polarization). To accelerate analysis, we leverage this behavior and solve for β and γ first.

Figure 7B:
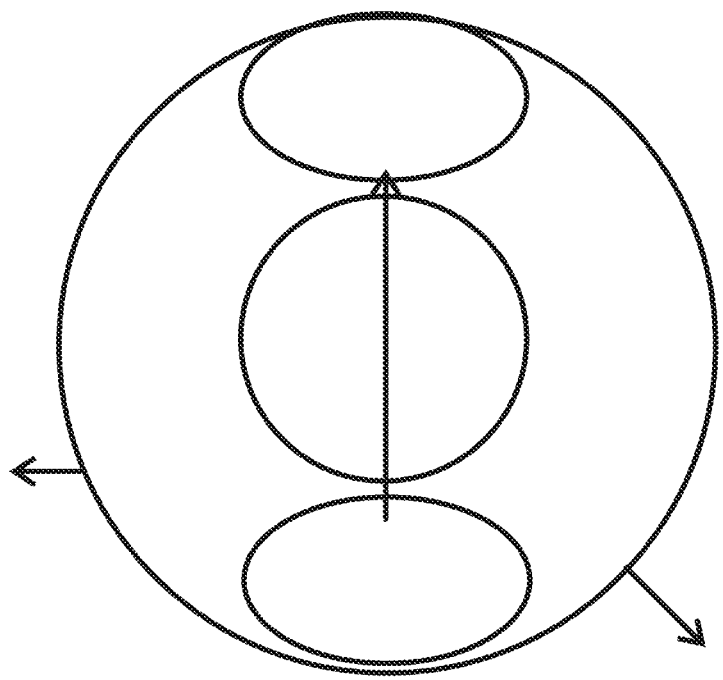
FIGS. 7A-B. Diagrams showing the effects on the circle-trace of angles A) $\beta$ and B) $\gamma$. A) For different angles of $\beta$, the circle-trace will have a different horizontal position on the Poincaré sphere. B) For different values of $\gamma$, the center of the circle-trace will rotate around the Poincaré sphere.
Figure 7A:
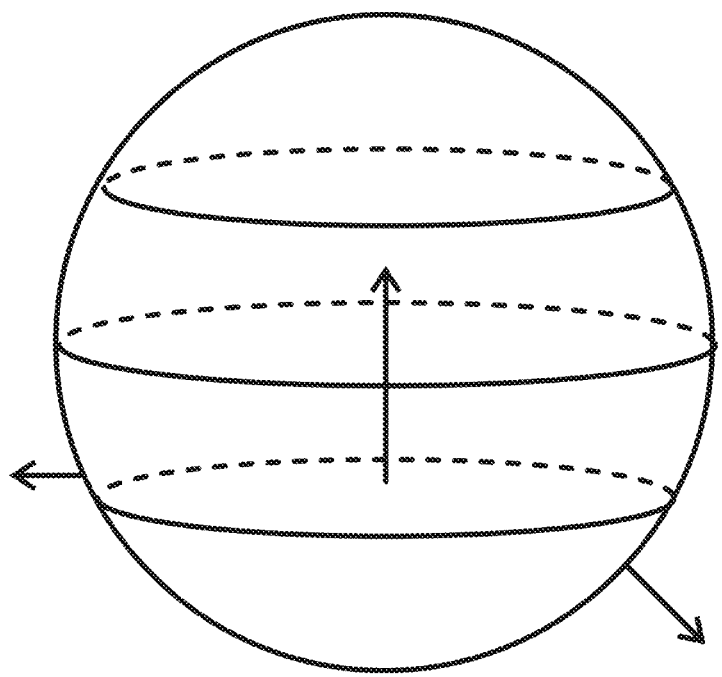

The angle β affects the radius of the circle trace (FIG. 7A). Because the circle-trace is always on the surface of the sphere, changing the radius of the circle will also change its horizontal position on the sphere. The first step to solve for β is to convert the stokes parameter vector $<s_1, s_2, s_3>$, which represents x, y, and z in Cartesian coordinates, to spherical coordinates. Since $<s_1, s_2, s_3>$ always lies on the surface of a sphere of radius 1, converting them to spherical coordinates results in r=1, leaving only θ (polar angle) and φ (azimuthal angle) as the free variables. Using θ and φ like an x and y coordinate in a 2D plane, the circle-trace is fit to a circle to obtain a radius. This radius will be equal to the maximum value of $$\phi[-\frac{\pi}{2}, \frac{\pi}{2}]$$

(azimuthal). The angle β is equal to radius/2.

The angle γ affects the center of the circle-trace on the equator of the Poincaré sphere (FIG. 7B). Taking the circle fit generated from θ and φ previously, notice that the center y (φ) coordinate will always be zero and the center x (θ) coordinate corresponds to the center of the sphere. The angle γ is equal to $-x_{Center}/2$. Fitting both β and γ is performed with the Matlab script.

Solving for δ

Figure 8A:
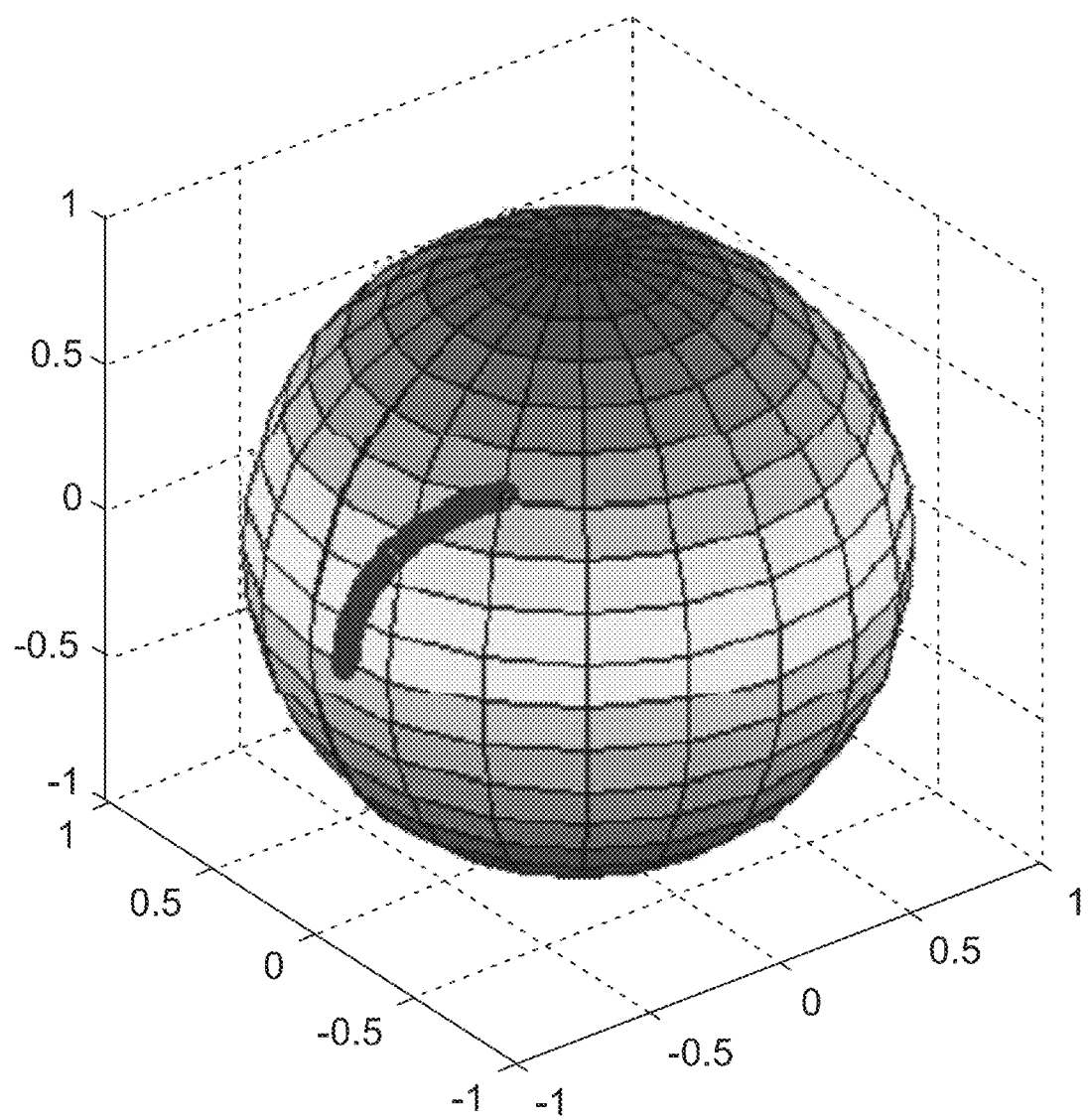
FIGS. 8A, B, C. Diagrams showing the effects on the circle-trace of angles $\delta$ and $\alpha$. A) A circle trace with a given value for $\delta$ and $\alpha$ is shown. B) When $\delta$ is changed, the circle-trace rotates, and the starting point changes. Notice that the whole trace moves together. In this graph, $\alpha$ has not yet been changed. C) When $\alpha$ is changed, the circle-trace expands. Notice that the starting point of the circle-trace remains fixed to the same point as in B), but the end-point changes. Changing $\alpha$ can also cause the circle-trace to contract.

The angle δ affects the starting point of the circle-trace on the Poincaré sphere (FIGS. 8A, B). The starting point will always lie somewhere on the circle defined by β and γ, but it will change position according to δ. Accordingly, fitting for δ is straightforward, but cannot be done until β and γ are already fit. All that needs to be done is to take the initial experimental value for $<s_1, s_2, s_3>$ and sweep through theoretical values of $<s_1, s_2, s_3>$ with varying δ and with applied force, f, equal to zero. The angle δ can have a value from 0 to 2π before it starts repeating values of $<s_1, s_2, s_3>$. After the sweep, the value of δ that produced a theoretical $<s_1, s_2, s_3>$ closest to the experimental $<s_1, s_2, s_3>$ is chosen. This best fit sweep is accomplished using the MATLAB™ script.

Solving for α

Figure 8B:
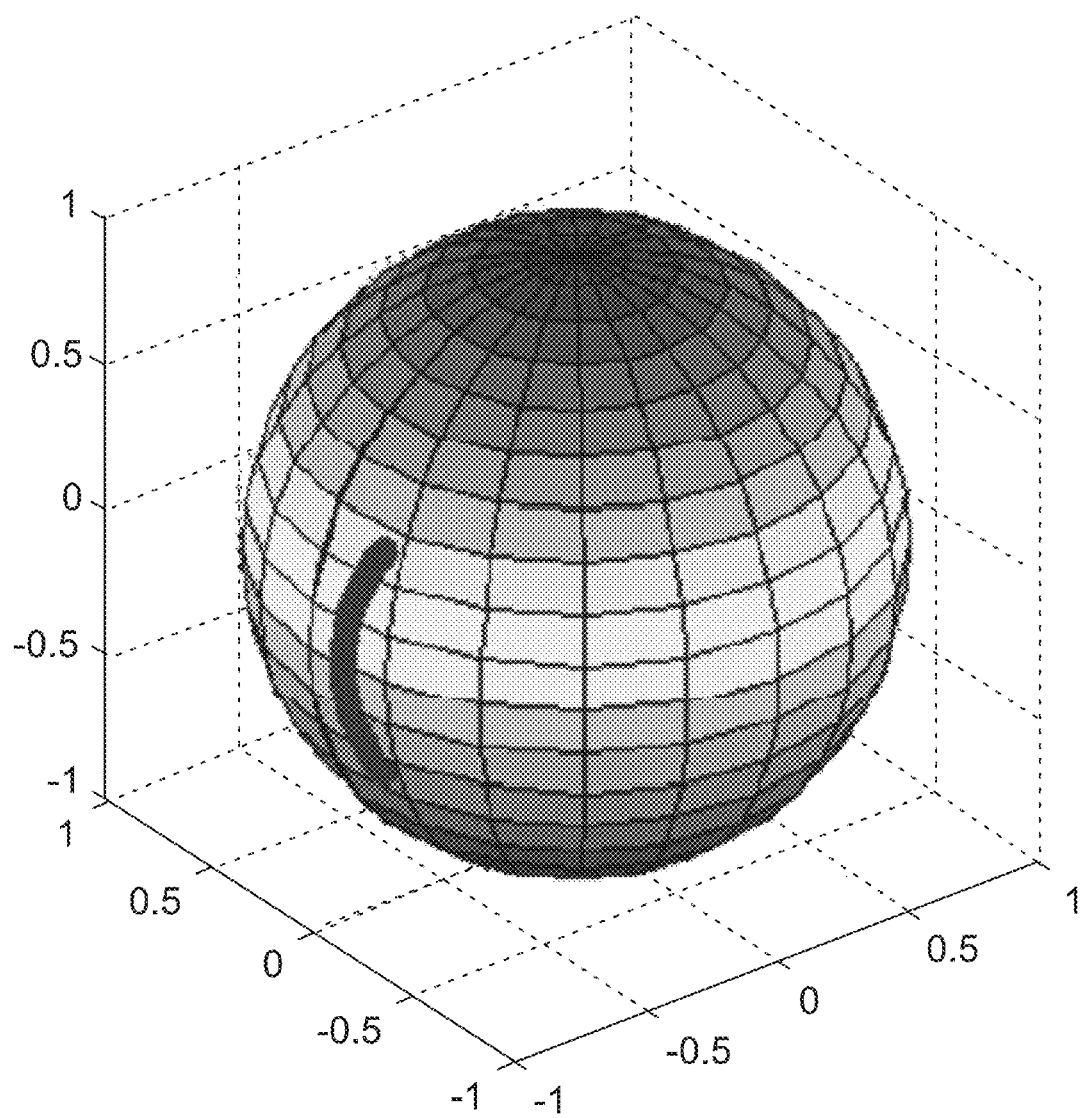
Figure 8C:
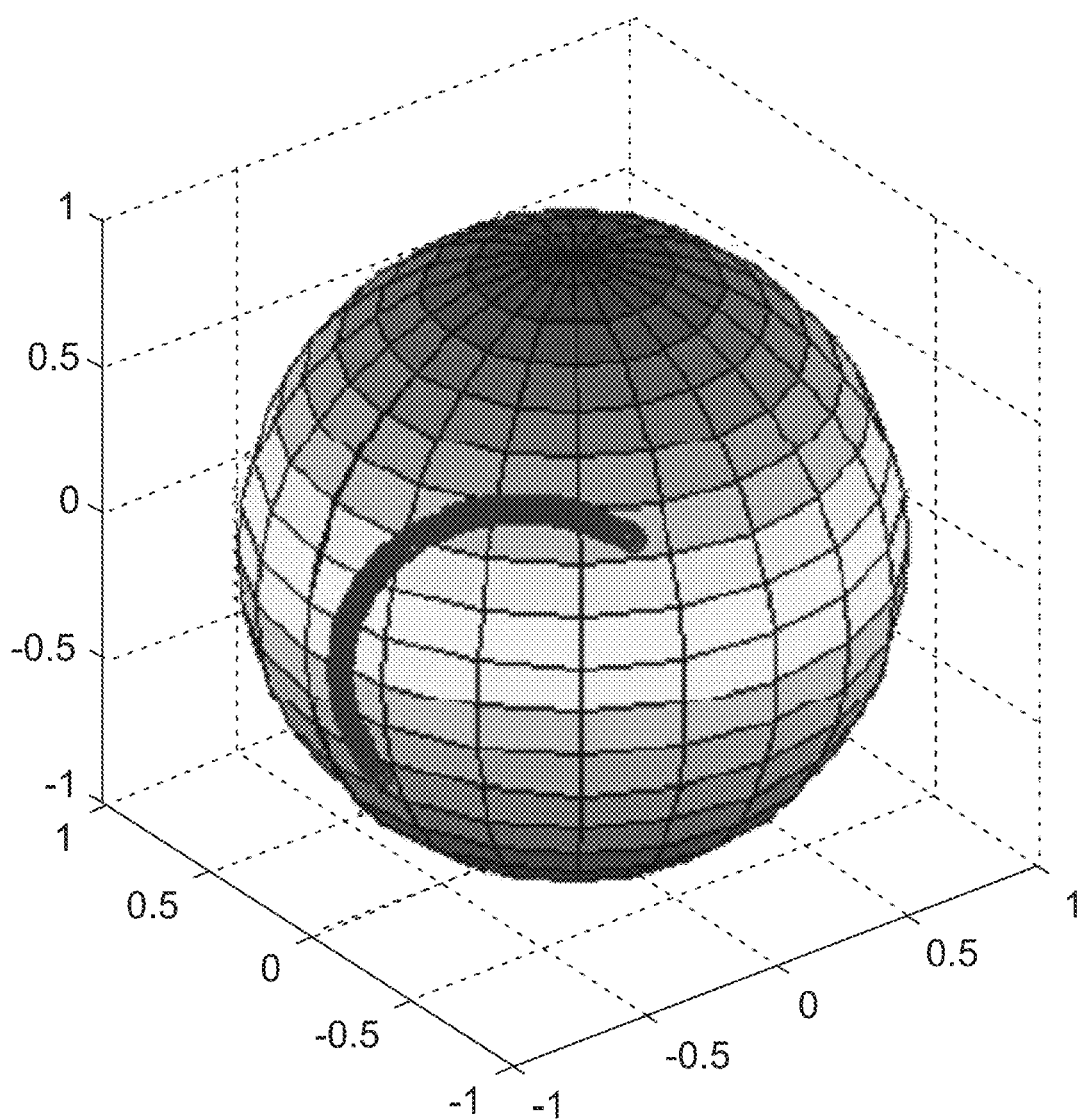

The angle α is the most important of the four angles and the trickiest angle to solve for. This is because α controls the rate at which the polarization-state traces out the circle-trace when force is applied to the fiber. For different values of α, the polarization-state will trace out more or less of the circle-trace (FIG. 8B, C). In order to fit for α, we need to know the stress applied to the fiber at the end-point of the circle-trace. Additionally, α cannot be fit until β, γ, and δ have been fit. We obtain the final applied stress from the reference data in our experiments, but it could easily be obtained from other means, such as placing a weight on top of the fiber in a controlled manner. Once this stress is determined, it is multiplied by the diameter of the fiber used for testing to obtain the applied force, f, in [N/m] at the final polarization state of the circle-trace. After the force is obtained, a is fit in a manner similar to δ. Taking the final experimental value for $<s_1, s_2, s_3>$, theoretical values are swept through with varying α and with the f equal to the final applied force. The range of α is 0 to $$\frac{\pi}{2}$$

before it starts repeating. After the sweep, the value of α that produced a theoretical polarization state closest to the experimental polarization state is chosen. This best fit sweep is also performed in Matlab.

Data Processing

The raw data from the polarimeter is in the form of three stokes parameters ($s_1$, $s_2$, $s_3$) and must be converted to a single variable representing the change in polarization (ΔPol). This should be done in a way that preserves any information contained in the polarization state ($s_1$, $s_2$, $s_3$), without simply throwing out any of the variables.

The raw data from the load-frame is in the form of an extension from zero compression and force on the sample from a load-cell. These values must be converted to strain and stress, respectively, in order to generate an appropriate stress-strain curve.

Phase-Angle of Circle-Ttrace

Figure 9A:
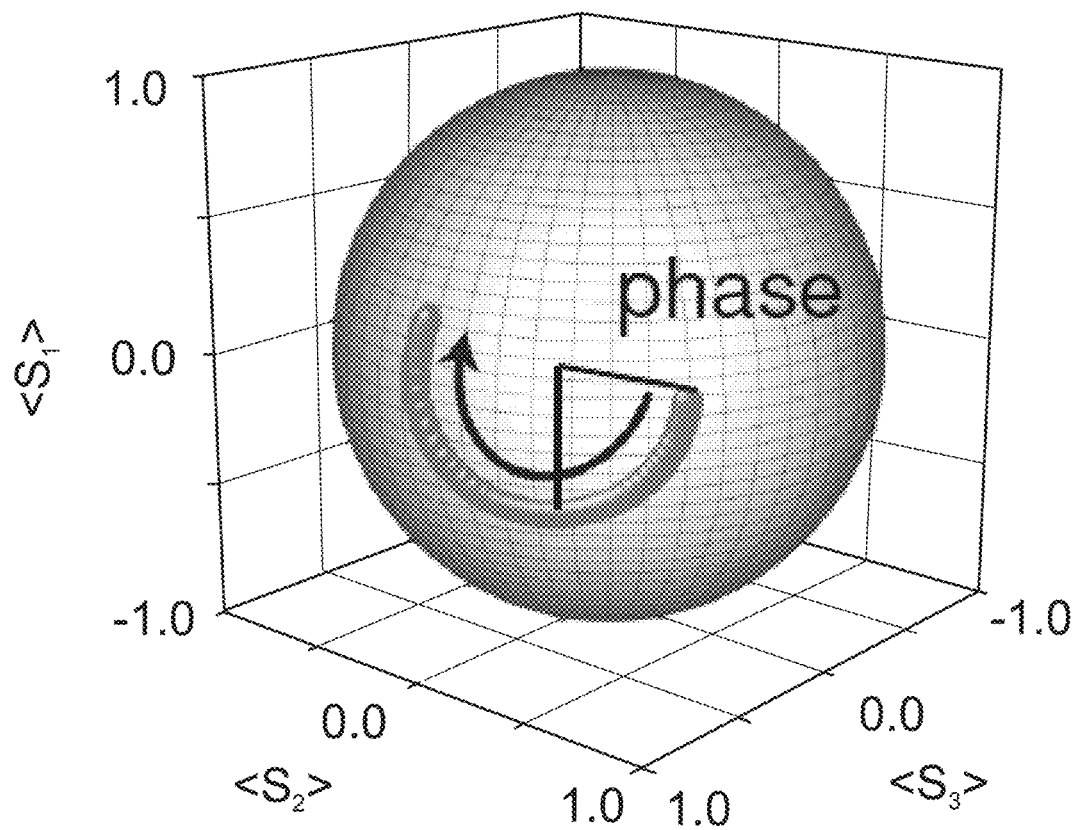
FIGS. 9A, B, C. When the fiber is stressed, the polarization state will trace out a circle arc on the Poincaré sphere. A) The phase angle of the circle-trace arc can be calculated to represent the change in polarization state. B) The circle-trace will always be an intersection of a vertical plane and the Poincaré sphere. The circle-trace lies on both the sphere and the intersecting plane. C) The Stokes parameters $s_1$ and $s_2$ can be converted to a single coordinate that lies on the intersecting plane. The sphere is viewed from above, with the intersecting plane indicated in green and the polarization-state data indicated in blue.

With the knowledge that the polarization-state of the light always traces out a circle on the Poincaré sphere, there is a simple measure of the circle which can serve as ΔPol without losing any of the information contained in the polarization state ($s_1,s_2,s_3$). The phase angle that the circle-trace arcs through as stress is applied (FIG. 9A) can be calculated without losing the information contained in the polarization state. This will become apparent as the process for calculating it is described.

Figure 9B:
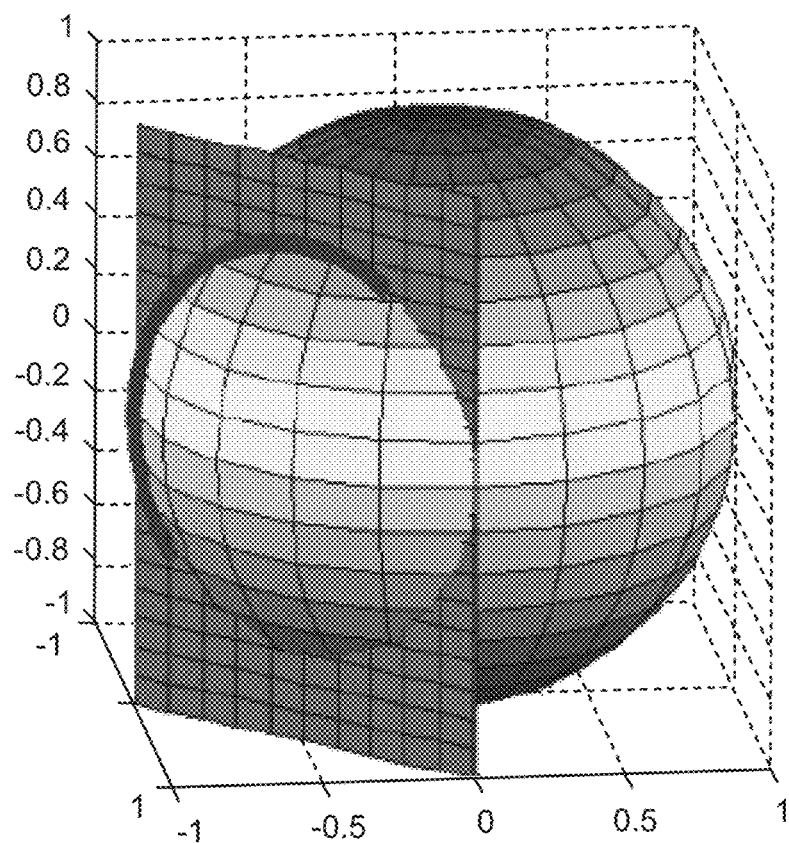

Because the center of the circle-trace is always on the equator of the Poincaré sphere ($s_3=0$), the circle-trace will always be an intersection of a vertical plane parallel to $s_3$-axis with the sphere (FIG. 9B). Finding the x-y coordinates of the circle-trace on this plane will allow us to get the phase angle we desire. Since the plane is always vertical and parallel to the $s_3$-axis, $s_3$ of the polarization state will be the y-coordinate of the circle-trace in the intersecting plane.

Figure 9C:
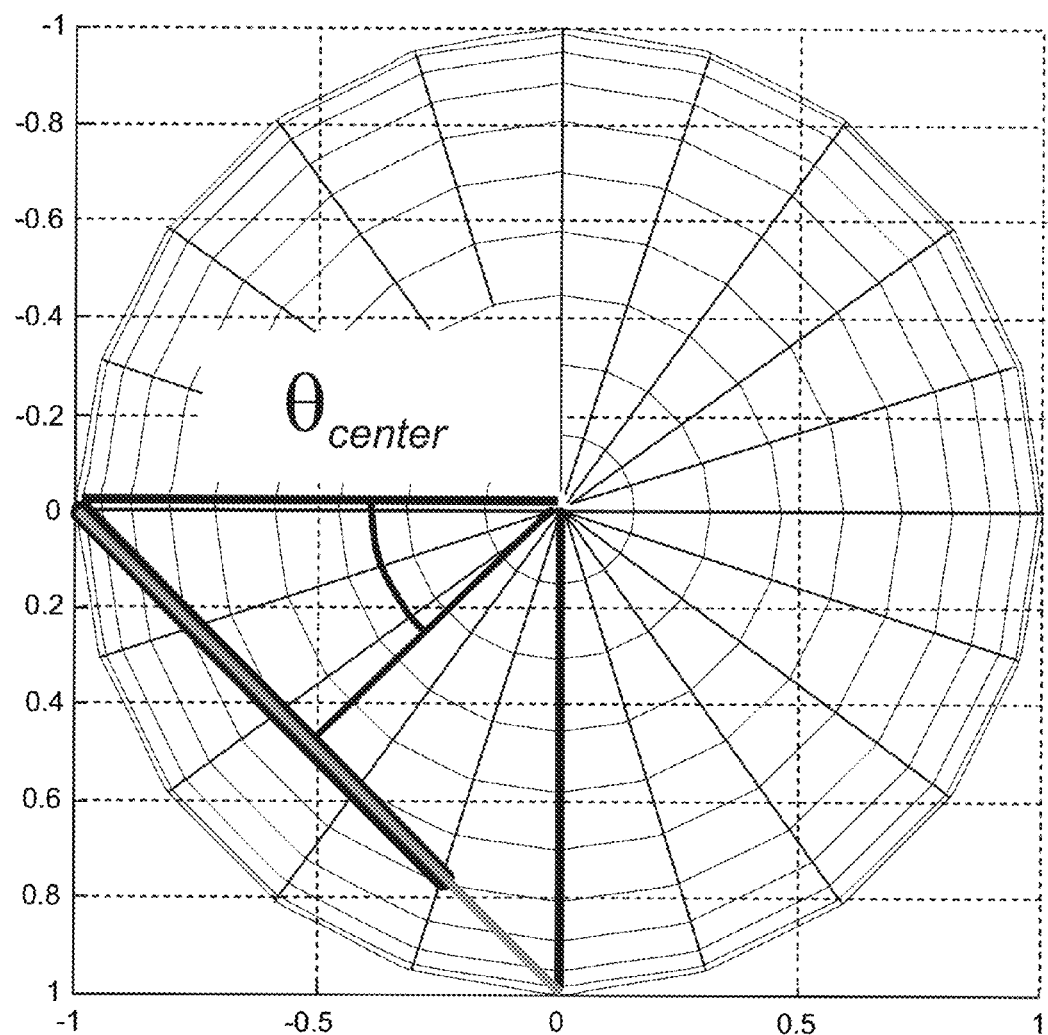

The x (a) linate of the circle-trace on the in (b) ng plane can be found by rotating the $s_1$ and $s_2$ points to the reference frame of the intersecting plane (FIG. 9C). In section 1.2, we found the center of the circle-trace in terms of θ in spherical coordinates. The center in angle θ is the angle of rotation of the reference frame that is needed. Using this angle, $\theta_{center}$, the x-coordinate of the circle-trace on the intersecting plane is found by $$x\text{-coordinate}=-s_1 \times \sin(\theta_{center})+s_2 \times \cos(\theta_{center}) \quad (9)$$

We now have x-y coordinates of the circle-trace on its intersecting plane. These coordinates are found using $s_1$, $s_2$ and $s_3$. Therefore, all of the information about the polarization state contained in those parameters remains embed (c) the x-y coordinates. Finally, the phase of the circle-trace is simply $$\text{phase} = \tan^{-1}\left(\frac{y-\text{coordinate}}{x-\text{coordinate}}\right) \quad (10)$$

To determine ΔPol, the phase is normalized by subtracting the initial phase-angle from everyphase value and dividing by π.

Stress and Strain

The data measured from the Instron load-frame (extension and force) must be processed slightly to convert it to stress and strain. The extension is divided by the initial, measured thickness (height) of the sample to produce strain. Similarly, the force is divided by the initial cross-sectional area (width×depth) over which the force is applied to produce the stress. Technically, processing the data in this way results in engineering stress and strain, but it is common practice to measure the engineering stress and strain and report it as stress and strain.

The raw data from the fiber sensor, measured by the polarimeter, gives the polarization state ($s_1$, $s_2$, $s_3$) with respect to time. To align the fiber sensor data with that from the Instron loadframe, the time axis must be converted to strain. This is done by multiplying the recorded time by the crosshead velocity, 0.1 mm/s to produce extension, and dividing the extension by the initial measured thickness (height) of the sample. Once the time has been converted to strain, it is possible to match the fiber sensor data to the load-frame reference data.

System Calibration

After the raw data has been processed, the data from the fiber sensor must still be calibrated. This process combines results of both the fitting algorithm and data processing steps to produce a stress-strain curve from the fiber sensor data.

In order to run the fitting algorithm, the maximum stress from the Instron load-frame must be used. This value is taken straight from the processed load-frame reference data. Once it has been plugged into the fitting algorithm script, it is used to generate a theoretical circle-trace that closely matches the experimental data. This theoretical circle-trace relates polarization state to applied force (f, [N/m]), but the polarization state is in the form of stokes parameters ($s_1$, $s_2$, $s_3$).

Figure 10:
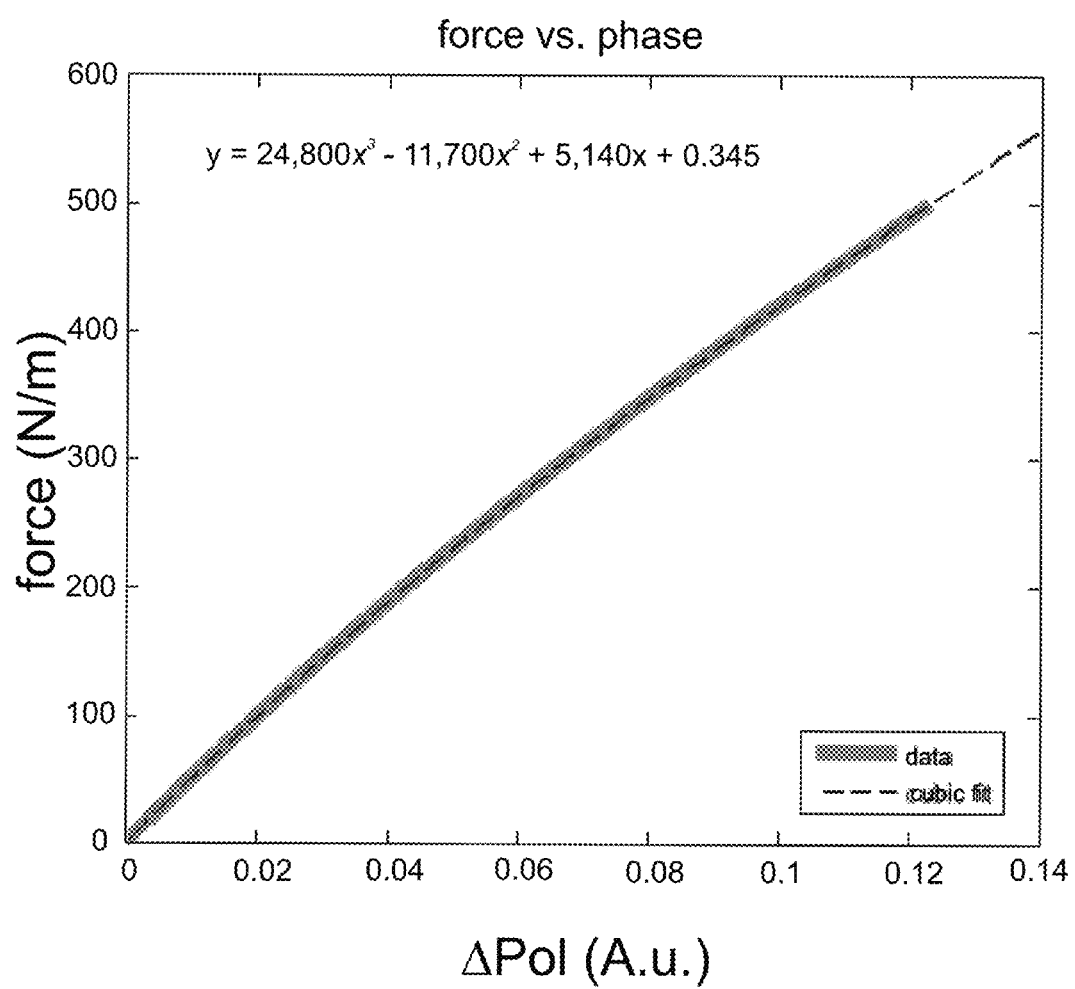
FIG. 10. Calibration curve generated from a MATLAB™ script. The solid line shows the relationship between applied force (f) and polarization state ($\Delta$Pol) derived from the theoretical fit of the circle-trace. The dashed line shows a cubic fit of the plotted relationship. The cubic fit equation is shown and is used as a calibration curve to calibrate the raw data in the form of $\Delta$Pol and convert it first to applied force (f) and finally applied stress.
Figure 11A:
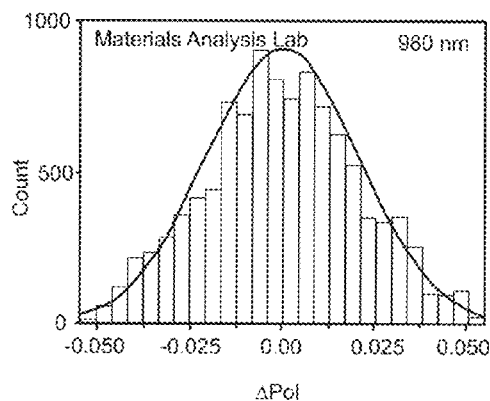
FIGS. 11A-H. Noise histograms characterizing the noise level of our fiber sensor in different environments and at different testing wavelengths of light, along with their normal distribution curves. a-d) Histograms for 980 nm light taken A) in the materials analysis lab with the sensor set up on the load-frame, B) in a chemistry lab on a countertop, C) inside of a laminar flow hood, and D) in an optical device characterization lab with the sensor set up on a vibration isolation table. e-h) Histograms for 1550 nm light taken E) in the materials analysis lab with the sensor set up on the load-frame, F) in a chemistry lab on a countertop, G) inside of a laminar flow hood, and H) in an optical device characterization lab with the sensor set up on a vibration isolation table.
Figure 11B:
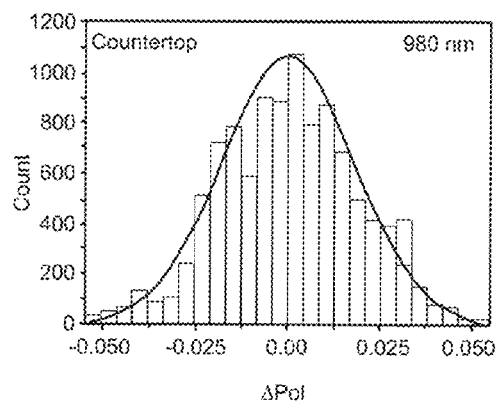
Figure 11C:
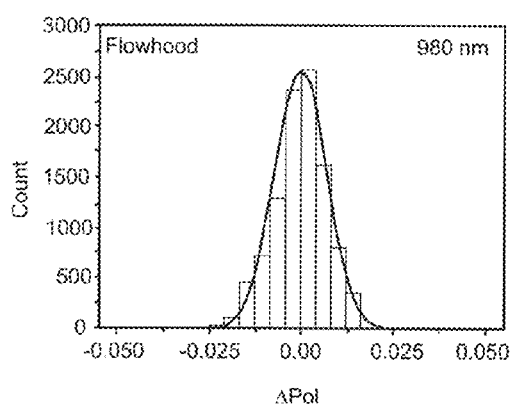
Figure 11D:
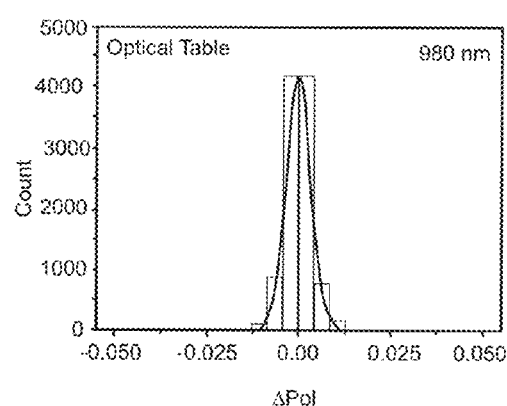
Figure 11E:
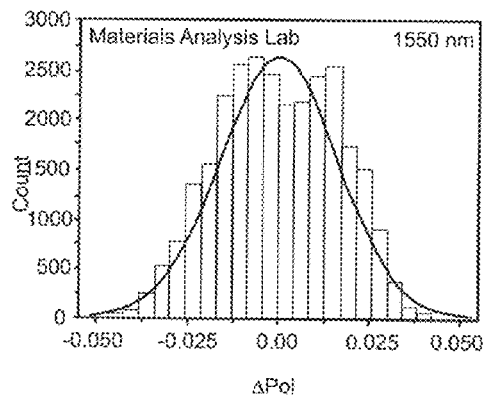
Figure 11F:
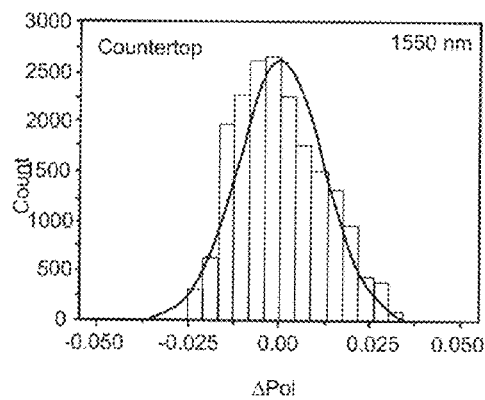
Figure 11G:
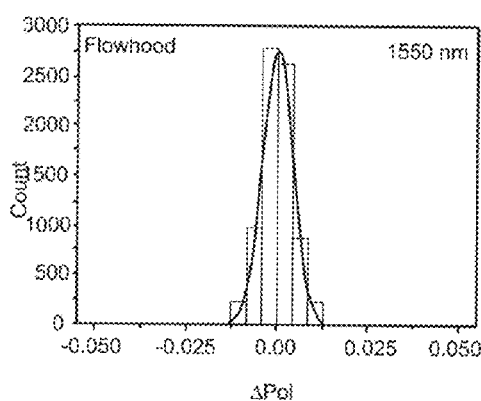
Figure 11H:
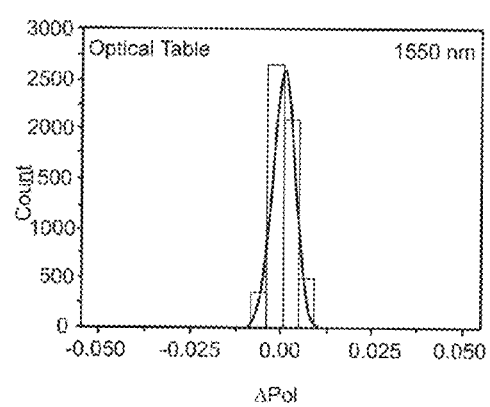

The theoretical value of $<s_1, s_2, s_3>$ is converted to ΔPol using the same data processing method as the experimental data, described above. After the theoretical polarization state is converted to ΔPol, we have a relationship between ΔPol and applied force, f. The relationship between ΔPol and f is plotted and fit to a polynomial curve (usually $2^{nd}$ or $3^{rd}$ order) (FIG. 10). This function is our calibration curve. By plugging in the experimental values for ΔPol, we can calculate the experimentally measured f and convert it to stress by dividing by the width of the fiber used in the sensor. This calibration process only needs to be performed once for each sample. Additional measurements on the same sample (and with the experimental setup unchanged) can be calibrated using the same calibration curve.

System Configuration

The sensor described in this work is portable in the sense that it may be moved easily without excessive calibration or alignment each time. It is important to note that portable is distinct from handheld. Throughout the process of performing the present series of experiments, the system was transported in a backpack to and from the materials analysis lab in a different building by one person repeatedly and was set-up within minutes. The main components of the sensor easily fit within a standard backpack and may be packed up without any damage to them. Additionally, minimal set-up time is needed due to the lack of free space optics, which require alignment. It is shown with a four wavelength laser. Clearly, this component could be further reduced in size.

Another requirement of a portable sensor is that it may operate in several environments. As indicated by the noise measurements and sensitivity calculations, the sensor operation is affected by noise. That being said, it shows an acceptably low noise level (low enough to measure the Young's modulus in biomaterials) in all the environments in which we measured the noise. This includes a materials analysis lab which had other experiments going on in parallel, such as stress/strain and fracture measurements. These measurements cause extremely high mechanical vibrations, significantly higher than levels experienced in a normal lab setting. This level is clearly evident in the measurements on a normal lab countertop and in a laminar flow hood, which are below the materials analysis lab values.

Noise and Sensitivity

Noise

In order to evaluate the robustness of our sensor system in different environments, noise measurements were performed in four locations: the mechanical materials analysis lab where the primary experiments were performed, in an optical device characterization lab on a vibration isolating optical table, on a countertop in a chemistry lab, and inside a laminar flow hood inside a chemistry lab.

In the materials analysis lab where the primary experiments were performed, the fiber sensor was set up on the load frame in exactly the same configuration as during other experiments. However, the measurements were taken with no sample on top of the fiber. These measurements had very high noise levels due to environmental vibrations. Therefore, to more rigorously establish a baseline noise threshold, we performed additional measurements on an optical table, on a countertop, and inside a laminar flow hood. In these offsets of measurements, the fiber sensor was set up in a similar manner to the primary experiments with a similar length of fiber, and the PM fiber was taped down to the each surface (optical table, countertop, flow hood) where the measurement was performed.

In all sets of measurements, several sets of data were measured at both wavelengths and the polarization state was analyzed as described in section 1. After the data was analyzed, we evaluated the noise distribution, which can be seen in histograms in FIGS. 11A-H. By fitting the distribution to a Gaussian or normal function, we can determine the noise threshold for each set of experimental conditions.

Sensitivity

Sensitivity was calculated using the noise measurements. First, MATLAB™ was used to calculate a relationship between $\Delta$Pol, applied stress ($\sigma$), and interaction length (l) assuming the optimum value for alpha. This relationship was plotted and fit to a function (with $R^2=1$) to generate an ideal operating curve that predicts the polarization change ($\Delta$Pol) for a given applied stress ($\sigma$) and interaction length (l). In practice, the operating curve may vary as alpha will not always have the optimum value in the experimental setup. The ideal operating curves for 980 nm (equation S7) and 1550 nm (equation S8) are given below:

$$\Delta Pol_{980} = (3.785 \times 10^{-5}) \sigma l \quad (11)$$

$$\Delta Pol_{1550} = (3.907 \times 10^{-5}) \sigma l \quad (11)$$

Once these ideal operating curves were obtained, sensitivity was calculated. Using the standard deviation of the measured noise for $\Delta$Pol and 18 mm for l (the approximate length of our samples), we calculated the applied stress. This stress corresponds to the standard level of noise in the system, so anything above this noise should be detectable using our sensor and data analysis method.

Sections of the disclosure set forth above are adapted from M. Harrison, A. M. Armani, "Portable polarimetric fiber stress sensor system for visco-elastic and biomimetic material analysis", Applied Physics Letters 106 (20), 191105 (2015) (Copyright 215. The University of Southern California).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

1 F. Cellini, S. Khapli, S. D. Peterson, and M. Porfiri, Applied Physics Letters 105 (6), 061907 (2014); Hao Zhou, Honglong Zhang, Yongmao Pei, Hao-Sen Chen, Hongwei Zhao, and Daining Fang, Applied Physics Letters 106, 081904 (2015); Haoran Fu, Sheng Xu, Renxiao Xu, Jianqun Jiang, Yihui Zhang, John A. Rogers, and Yonggang Huang, Applied Physics Letters 106, 091902 (2015).
2 G. J. Kacprzynski, A. Sarlashkar, M. J. Roemer, A. Hess, and W. Hardman, JOM 56 (3), 29 (2004).
3 K. Hoyt, B. Castaneda, M. Zhang, P. Nigwekar, P. A. di Sant'Agnese, J. V. Joseph, J. Strang, D. J. Rubens, and K. J. Parker, Cancer Biomarkers 4 (4-5), 213 (2008); I. D. Johnston, D. K. McCluskey, C. K. L. Tan, and M. C. Tracey, Journal of Micromechanics and Microengineering 24 (3), 7 (2014); N. S. Lu, C. Lu, S. X. Yang, and J. Rogers, Advanced Functional Materials 22 (19), 4044 (2012).
4 T. A. Krouskop, T. M. Wheeler, F. Kallel, B. S. Garra, and T. Hall, Ultrasonic Imaging 20 (4), 260 (1998).
5 A. Samani, J. Bishop, C. Luginbuhl, and D. B. Plewes, Physics in Medicine and Biology 48 (14), 2183 (2003).
6 A. Samani, J. Zubovits, and D. Plewes, Physics in Medicine and Biology 52 (6), 1565 (2007).
7 P. N. T. Wells and H. D. Liang, Journal of the Royal Society Interface 8 (64), 1521 (2011); U. Zaleska-Dorobisz, K. Kaczorowski, A. Pawlus, A. Puchalska, and M. Inglot, Advances in Clinical and Experimental Medicine 23 (4), 645 (2014); L. Penuela, F. Wolf, R. Raiteri, D. Wendt, I. Martin, and A. Barbero, Journal of Biomechanics 47 (9), 2157 (2014); M. Horimizu, T. Kawase, T. Tanaka, K. Okuda, M. Nagata, D. M. Burns, and H. Yoshie, Micron 48, 1 (2013).
8 B. S. Garra, Ultrasound quarterly 23 (4), 255 (2007); D. W. Good, A. Khan, S. Hammer, P. Scanlan, W. M. Shu, S. Phipps, S. H. Parson, G. D. Stewart, R. Reuben, and S. A. McNeill, Plos One 9 (11), 8 (2014); S. R. Mousavi, A. Sadeghi-Naini, G. J. Czarnota, and A. Samani, Medical Physics 41 (3), 12 (2014); J. Ophir, I. Cespedes, H. Ponnekanti, Y. Yazdi, and X. Li, Ultrasonic Imaging 13 (2), 111 (1991); B. M. Ahn, J. Kim, L. Ian, K. H. Rha, and H. J. Kim, Urology 76 (4), 1007 (2010).
9 D. W. Good, G. D. Stewart, S. Hammer, P. Scanlan, W. Shu, S. Phipps, R. Reuben, and A. S. McNeill, Bju International 113 (4), 523 (2014).
10 T. H. Chua and C. L. Chen, Applied Optics 28 (15), 3158 (1989).
11 R. C. Gauthier and J. Dhliwayo, Optics and Laser Technology 24 (3), 139 (1992); G. Liu and S. L. Chuang, Sensors and Actuators a-Physical 69 (2), 143 (1998).
12 See supplemental material at [URL will be inserted by AIP] for additional details.
13 I. Kuan Lin, Kuang-Shun Ou, Yen-Ming Liao, Yan Liu, Kuo-Shen Chen, and Xin Zhang, Journal of Microelectromechanical Systems 18; 16 (5), 1087 (2009); Alvaro Mata, Aaron J. Fleischman, and Shuvo Roy, Biomedical Microdevices 7 (4), 281 (2005).

What is claimed is:

1. An apparatus comprising:
a light source;
an in-line fiber polarizer that polarizes light received from the light source, the in-line fiber polarizer outputting light in a first polarization state;
a polarization-maintaining fiber having fast axis and a slow axis, the polarization-maintaining fiber receiving the light in a first polarization state which is then transmitted through the polarization-maintaining fiber exiting as light in a second polarization state, the polarization-maintaining fiber contacting a test sample;
a compression device that applies a force (F) to and compresses the test sample that is in contact with the polarization-maintaining fiber, the force being applied over at a contact area on the test sample, the compression device applying a time varying force to the test sample in which the force is sequentially increased;
a polarimeter that receives the light in a second polarization state and outputs polarization state data for the light in a second polarization state; and
a data processor in communication with the polarimeter, the data processor receiving and storing the polarization state data.

2. The apparatus of claim 1 wherein the data processor receives and stores the polarization state data as a function of time.

3. The apparatus of claim 1 wherein the data processor is operable to calculate stress as a function of strain for the test sample from the polarization state data.

4. The apparatus of claim 1 wherein the light source includes a monochromatic light source.

5. The apparatus of claim 1 further comprising an integrated imaging system to monitor sample deformation.

6. The apparatus of claim 1 wherein the second polarization state is characterized by Stokes parameters ($s_0$, $s_1$, $s_2$, and $s_3$) and the data processor operable to convert the Stokes parameters to a single variable representing a change in polarization ($\Delta$Pol) that is related to an applied force.

7. The apparatus of claim 5 wherein the data processor is operable to calculate the force (F) applied to the test sample from a calibration curve that plots force versus change in polarization ($\Delta$Pol), stress by dividing the force (F) by the contact area, and strain by dividing a change is thickness for the test sample divided by an initial thickness.

8. The apparatus of claim 7 wherein the calibration curve is determined by applying known forces to a reference sample and measuring the change in polarization.

9. The apparatus of claim 7 wherein the data processor is operable to numerically determine the force (F) applied to the test sample from equations 1, 2, and 3:

$$F = 2N^3(1+\sigma)(p_{12}-p_{11})L_{b0}f/(\lambda \pi b Y) \quad (1)$$

$$\tan(2\phi) = F \sin(2\alpha)/(1 + F\cos(2\alpha)) \quad (2)$$

$$L_b = L_{b0}(1 + F^2 + 2F\cos(2\alpha))^{-1/2} \quad (3)$$

f is a force acting upon the polarization-maintaining fiber;
$\sigma$ is Poisson's ratio for the polarization-maintaining fiber;
$\alpha$ is an angle at which f acts with respect to a fast and slow axis coordinate system of the polarization-maintaining fiber;
$L_{b0}$ is an unstressed beat length;
$p_{ij}$ are photoelastic constants for the polarization-maintaining fiber;
Y is a Young's modulus of the polarization-maintaining fiber;
b is a radius of a fiber cladding; and
$\phi$ is the angle by which light is further rotated in traveling from a polarization-maintaining fiber input to a stressed section of fiber.

10. The apparatus of claim 9 wherein the data processor is operable to numerically determine $\phi$, $\beta$, $\delta$, $\gamma$ given a wavelength ($\lambda$) and interaction length (l) from the polarization state data for the light in a first polarization state from equations 1, 2, 3, and 4:

$$\begin{bmatrix} E_x \\ E_y \end{bmatrix} = \begin{bmatrix} \cos\gamma & \sin\gamma \\ -\sin\gamma & \cos\gamma \end{bmatrix} \begin{bmatrix} 1 & 0 \\ 0 & e^{j\delta} \end{bmatrix} \begin{bmatrix} \cos\phi & -\sin\phi \\ \sin\phi & \cos\phi \end{bmatrix} \begin{bmatrix} e^{-jkN_s l} & 0 \\ 0 & e^{-jkN_f l} \end{bmatrix} \\ \begin{bmatrix} \cos\phi & \sin\phi \\ -\sin\phi & \cos\phi \end{bmatrix} \begin{bmatrix} \cos\beta & \sin\beta \\ -\sin\beta & \cos\beta \end{bmatrix} \begin{bmatrix} E_{x0} \\ 0 \end{bmatrix} \quad (4)$$

$E_{xo}$ is an x component of an electric field for the light in a first polarization state;
$E_x$ and $E_y$ are x and y components of the electric field for the light in a second polarization state;
$\beta$ is the angle of the light in a first polarization state with respect to a fast and slow axis system for the polarization-maintaining fiber;
$\phi$ is the angle by which light is further rotated in traveling from the polarization-maintaining fiber input to the stressed section of fiber;
k is a wave vector for light of wavelength $\lambda$ travelling through the polarization-maintaining fiber;
l is a length of a section of the polarization-maintaining fiber being compressed;
$N_f$ is a refractive index of the fast axis for the polarization-maintaining fiber in a stressed section of the polarization-maintaining fiber;
$N_s$ is a refractive index of the slow axis for the polarization-maintaining fiber in the stressed section of the polarization-maintaining fiber;
$\gamma$ an axis by which axes of the polarization-maintaining fiber are rotated at an angle with respect to x and y axes of the polarimeter; and
d is a parameter that accounts for accumulated phase caused by misalignment of the light in the first polarization state with the fast and slow axes.

11. The apparatus of claim 1 further comprising one or more additional polarization-maintaining fibers contacting the test sample.

12. An apparatus comprising:
a light source;
an in-line fiber polarizer that polarizes light received from the light source, the in-line fiber polarizer outputting light in a first polarization state;
a plurality of polarization-maintaining fibers contacting a test sample, each polarization-maintaining fiber having a fast axis and a slow axis;
a first light multiplexing splitter that allows the light in a first polarization state to be outputted to a selected polarization-maintaining fiber from the plurality of polarization-maintaining fibers, the selected polarization-maintaining fiber receiving the light in a first polarization state which is then transmitted through the polarization-maintaining fiber exiting as light in a second polarization state;
a compression device that applies a force (F) to and compresses the test sample that is in contact with the plurality of polarization-maintaining, the force being applied over at a contact area on the test sample, the compression device applying a time varying force to the test sample in which the force is sequentially increased;
a second light multiplexing switch that allows the light in a second polarization state to be selectively outputted to a polarimeter from the selected polarization-maintaining fiber, the second light multiplexing switch cyclically selecting each fiber of the plurality of polarization-maintaining fibers;
a polarimeter that receives the light in a second polarization state and outputs polarization state data for the light in an second polarization state; and
a data processor in communication with the polarimeter, the data processor receiving and storing the polarization state data.

13. The apparatus of claim 12 wherein the first light multiplexing splitter is a passive splitter that simultaneously outputs light to multiple polarization-maintaining fibers.

14. The apparatus of claim 13 wherein the data processor or another data process controls the second light multiplexing switch.

15. The apparatus of claim 12 wherein the first light multiplexing splitter is a active splitter that simultaneously outputs light to the selected polarization-maintaining fibers.

16. The apparatus of claim 14 wherein the data processor or another data process controls the first and second light multiplexing switches.

17. The apparatus of claim 14 wherein the light source includes a monochromatic light source.

18. The apparatus of claim 14 wherein the data processor receives and stores the polarization state data as a function of time.

19. The apparatus of claim 14 wherein the data processor is operable to calculate stress as a function of strain for the test sample from the polarization state data as a map over the contact area.

20. The apparatus of claim 14 with an integrated imaging system to monitor sample deformation.

21. The apparatus of claim 14 wherein the second polarization state is characterized by Stokes parameters ($s_0$, $s_1$, $s_2$, and $s_3$) and the data processor operable to convert the Stokes parameters to a single variable representing a change in polarization (ΔPol) that is related to an applied force (F).

22. The apparatus of claim 21 wherein the data processor is operable to calculate the force (F) applied to the test sample from a calibration curve that plots force versus change in polarization (ΔPol), stress by dividing the force (F) by the contact area, and strain by dividing a change in thickness for the test sample divided by an initial thickness.

23. The apparatus of claim 22 wherein the calibration curve is determined by applying known forces to a reference sample and measuring the change in polarization.

24. The apparatus of claim 21 wherein the data processor is operable to numerically determine the force (F) applied to the test sample from equations 1, 2, and 3:

$$F = 2N^3(1+\sigma)(p_{12}-p_{11})L_{b0}f/(\lambda \pi b Y) \quad (1)$$

$$\tan(2\phi) = F\sin(2\alpha)/(1+F\cos(2\alpha)) \quad (2)$$

$$L_b = L_{b0}(1+F^2+2F\cos(2\alpha))^{-1/2} \quad (3)$$

f is a force acting upon the selected polarization-maintaining fiber;

σ is Poisson's ratio for the selected polarization-maintaining fiber;

α is an angle at which f acts with respect to a fast and slow axis coordinate system of the polarization-maintaining fiber;

$L_{b0}$ is an unstressed beat length;

$p_{ij}$ are photoelastic constants for the selected polarization-maintaining fiber;

Y is a Young's modulus of the selected polarization-maintaining fiber;

b is a radius of a fiber cladding; and

φ is the angle by which light is further rotated in traveling from a polarization-maintaining fiber input to a stressed section of fiber.

25. The apparatus of claim 24 wherein the data processor is operable to numerically determine φ, β, δ, γ given a wavelength (λ) and interaction length (l) from the polarization state data for the light in a first polarization state from equations 1, 2, 3, and 4:

$$\begin{bmatrix} E_x \\ E_y \end{bmatrix} = \begin{bmatrix} \cos\gamma & \sin\gamma \\ -\sin\gamma & \cos\gamma \end{bmatrix} \begin{bmatrix} 1 & 0 \\ 0 & e^{j\delta} \end{bmatrix} \begin{bmatrix} \cos\phi & -\sin\phi \\ \sin\phi & \cos\phi \end{bmatrix} \begin{bmatrix} e^{-jkN_s l} & 0 \\ 0 & e^{-jkN_f l} \end{bmatrix}$$
$$\begin{bmatrix} \cos\phi & \sin\phi \\ -\sin\phi & \cos\phi \end{bmatrix} \begin{bmatrix} \cos\beta & \sin\beta \\ -\sin\beta & \cos\beta \end{bmatrix} \begin{bmatrix} E_{x0} \\ 0 \end{bmatrix} \quad (4)$$

$E_{xo}$ is an x component of an electric field for the light in a first polarization state;

$E_x$ and $E_y$ are x and y components of the electric field for the light in a second polarization state;

β is the angle of the light in a first polarization state with respect to a fast and slow axis system for the selected polarization-maintaining fiber;

φ is the angle by which light is further rotated in traveling from a selected polarization-maintaining fiber input to a stressed section of the selected polarization-maintaining fiber;

k is a wave vector for light of wavelength λ travelling through the polarization-maintaining fiber;

l is a length of a section of the selected polarization-maintaining fiber being compressed;

$N_f$ is a refractive index of the fast axis for the selected polarization-maintaining fiber in a stressed section of the selected polarization-maintaining fiber;

$N_s$ is a refractive index of the slow axis for the selected polarization-maintaining fiber in the stressed section of the polarization-maintaining fiber;

γ an axis by which axes of the selected polarization-maintaining fiber are rotated at an angle with respect to x and y axes of the polarimeter; and d is a parameter that accounts for accumulated phase caused by misalignment of the light in the first polarization state with the fast and slow axes.

26. The apparatus of claim 15 wherein the plurality of the polarization-maintaining fibers includes from 2 to 64 polarization-maintaining fibers.

27. The apparatus of claim 15 wherein the plurality of the polarization-maintaining fibers includes from 64 to 256 polarization-maintaining fibers.

28. The apparatus of claim 15 wherein the plurality of polarization-maintaining fibers have a fiber-to-fiber spacing equal to less than 1mm.

\* \* \* \* \*

UNITED STATES PATENT AND TRADEMARK OFFICE
CERTIFICATE OF CORRECTION

PATENT NO. : 9,791,333 B2
APPLICATION NO. : 15/178795
DATED : October 17, 2017
INVENTOR(S) : Andrea M. Armani et al.

It is certified that error appears in the above-identified patent and that said Letters Patent is hereby corrected as shown below:

In the Claims

Column 20, Line 4, Claim 10:
Delete "$\gamma$ an axis" and
Insert -- $\gamma$ is an axis --.

Column 20, Line 33, Claim 12:
After "contact with the plurality of polarization-maintaining"
Insert -- fibers --.

Column 20, Line 58, Claim 15:
After "multiplexing splitter is"
Delete "a" and
Insert -- an --.

Column 22, Line 33, Claim 25:
Delete "$\gamma$ an axis" and
Insert -- $\gamma$ is an axis --.

Signed and Sealed this
Twenty-seventh Day of March, 2018

Andrei Iancu
*Director of the United States Patent and Trademark Office*